US011047871B2

(12) United States Patent
Arnold et al.

(10) Patent No.: US 11,047,871 B2
(45) Date of Patent: Jun. 29, 2021

(54) CENTERING UNIT FOR DIAGNOSTIC LABORATORY TRANSPORTING COMPARTMENT

(71) Applicant: Roche Diagnostics Operations, Inc., Indianapolis, IN (US)

(72) Inventors: Daniel Arnold, Rotkreuz (CH); Fabian Wenzler, Neuenhof (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 292 days.

(21) Appl. No.: 15/947,326

(22) Filed: Apr. 6, 2018

(65) Prior Publication Data
US 2018/0292424 A1    Oct. 11, 2018

(30) Foreign Application Priority Data

Apr. 10, 2017 (EP) .................................... 17165672

(51) Int. Cl.
*G01N 35/00* (2006.01)
*G01N 35/04* (2006.01)
(Continued)

(52) U.S. Cl.
CPC ...... *G01N 35/0099* (2013.01); *B25J 15/0038* (2013.01); *B25J 15/0052* (2013.01);
(Continued)

(58) Field of Classification Search
CPC ............... G01N 35/0099; G01N 35/04; G01N 35/00613; G01N 35/026; G01N 37/00;
(Continued)

(56) References Cited

U.S. PATENT DOCUMENTS 4,982,553 A * 1/1991 Itoh ........................ G01N 35/02
53/246
5,221,519 A 6/1993 Wuerschum
(Continued)

FOREIGN PATENT DOCUMENTS

EP         3248737 A1 * 11/2017 .......... B25J 15/0266
JP    2004-061138 A     2/2004
(Continued)

OTHER PUBLICATIONS

Bhatt N., Chauhan N.R. (2016) Design of a Two Fingered Friction Gripper for a Wheel Mobile Robot. In: Choudhary R., Mandal J., Auluck N., Nagarajaram H. (eds) Advanced Computing and Communication Technologies. Advances in Intelligent Systems and Computing, vol. 452. Springer, Singapore (Year: 2016).*

*Primary Examiner* — Benjamin R Whatley
*Assistant Examiner* — Curtis A Thompson
(74) *Attorney, Agent, or Firm* — Roche Diagnostics Operations, Inc.

(57)                 ABSTRACT

A centering unit for diagnostics laboratory transporting compartment is presented. The centering unit for diagnostics laboratory transporting compartment comprises at least two arms with grippers for centering diagnostics laboratory transporting compartments of different diameters. For accurate and reliable centering of laboratory transporting compartments, the two arms are biased with a single elastic member. A laboratory system and a method for centering diagnostics laboratory transporting compartment and diagnostics laboratory transporting compartment holder are also disclosed.

14 Claims, 5 Drawing Sheets

(51) Int. Cl.
*B25J 15/00* (2006.01)
*B65G 47/244* (2006.01)
*B65G 47/24* (2006.01)
*B01L 9/06* (2006.01)
*B65G 43/08* (2006.01)
*G01N 35/02* (2006.01)
*G01N 1/00* (2006.01)
*G01N 35/10* (2006.01)
*G01N 37/00* (2006.01)

(52) U.S. Cl.
CPC ........... *B65G 47/24* (2013.01); *B65G 47/244* (2013.01); *G01N 35/00613* (2013.01); *G01N 35/04* (2013.01); *B01L 9/06* (2013.01); *B01L 2200/023* (2013.01); *B01L 2200/025* (2013.01); *B01L 2300/022* (2013.01); *B65G 43/08* (2013.01); *G01N 1/00* (2013.01); *G01N 35/00* (2013.01); *G01N 35/02* (2013.01); *G01N 35/026* (2013.01); *G01N 35/10* (2013.01); *G01N 37/00* (2013.01); *G01N 2035/00326* (2013.01); *G01N 2035/0406* (2013.01); *G01N 2035/0412* (2013.01); *G01N 2035/0494* (2013.01)

(58) Field of Classification Search
CPC ......... G01N 35/02; G01N 1/00; G01N 35/10; G01N 35/00; G01N 2035/0406; G01N 2035/0494; G01N 2035/0412; G01N 2035/00326; B65G 47/244; B65G 47/24; B65G 43/08; B25J 15/0052; B25J 15/0038; B01L 2200/023; B01L 2300/022; B01L 2200/025; B01L 9/06
See application file for complete search history.

(56) References Cited

U.S. PATENT DOCUMENTS

| | | | |
|---|---|---|---|
| 5,959,221 A | 9/1999 | Boyd et al. | |
| 6,177,050 B1 * | 1/2001 | Bybee | G01N 35/026 422/107 |
| 6,257,091 B1 * | 7/2001 | Cohen | B67B 7/182 81/3.2 |
| 6,873,566 B2 * | 3/2005 | Choi | G11C 7/18 365/230.03 |
| 2005/0210671 A1 * | 9/2005 | Itoh | B67B 7/02 29/801 |
| 2005/0252973 A1 * | 11/2005 | Itoh | G06K 7/10861 235/462.01 |
| 2008/0170967 A1 | 7/2008 | Itoh | |
| 2015/0177268 A1 * | 6/2015 | Reisch | G01N 33/00 436/180 |
| 2015/0233956 A1 * | 8/2015 | Buehr | G01N 35/04 422/63 |
| 2016/0159579 A1 | 6/2016 | Maldini et al. | |

FOREIGN PATENT DOCUMENTS

| | | | |
|---|---|---|---|
| JP | 2015-152406 A | 8/2015 | |
| WO | 2014/002953 A1 | 1/2014 | |
| WO | WO-2014002953 A1 * | 1/2014 | ........... B25J 15/022 |
| WO | 2014/113401 A1 | 7/2014 | |
| WO | 2015/155147 A1 | 10/2015 | |
| WO | 2015/198764 A1 | 12/2015 | |

* cited by examiner

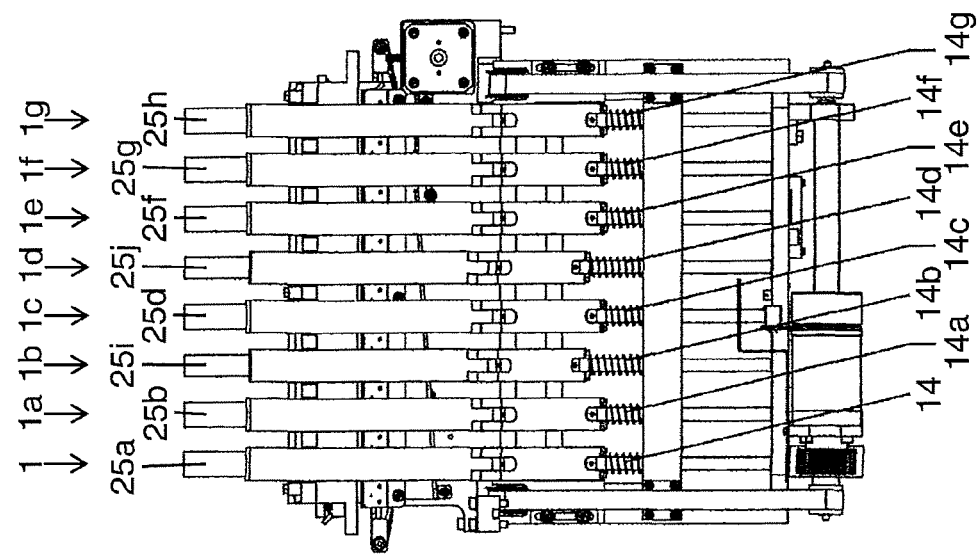
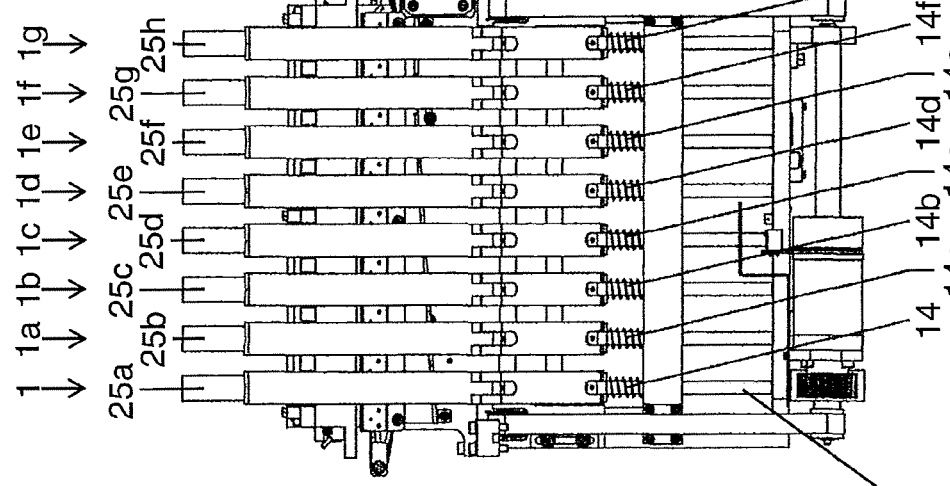
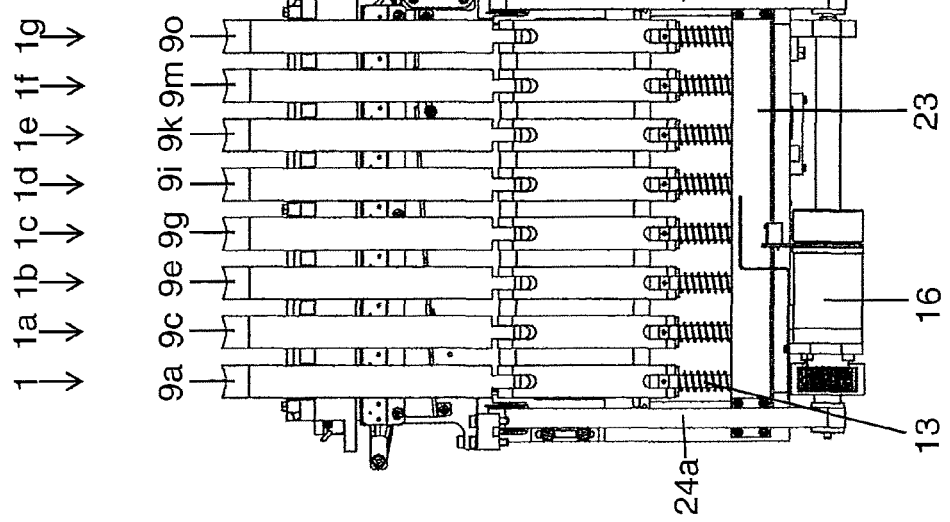

CENTERING UNIT FOR DIAGNOSTIC LABORATORY TRANSPORTING COMPARTMENT

CROSS-REFERENCE TO RELATED APPLICATIONS

This application claims the benefit of and priority to EP 17165672.1, filed Apr. 10, 2017, which is hereby incorporated by reference.

BACKGROUND

The present disclosure generally relates to the field of automated in vitro diagnostic sample processing and, in particular, to a unit, a system and a method for centering diagnostics laboratory transporting compartments in order to ensure accuracy and safety of certain test sample processing steps.

In diagnostic laboratory environments, liquid test samples, as well as test reagents, are transferred between multiple stations such as pre-analytical, analytical and post-analytical stations for test sample processing. Typically, liquid test samples and test reagents are transferred in diagnostics laboratory transporting compartments inserted in diagnostics laboratory transporting compartment holders which can receive either one or multiple diagnostics laboratory transporting compartments. Depending on the test sample type, test sample processing step, test reagent and manufacturer the dimensions of diagnostics laboratory transporting compartments like diameter, side length, height and geometry varies. Accordingly, diagnostics laboratory transporting compartment holders require flexible adaptors to receive diagnostics laboratory transporting compartments of different dimensions. Diagnostics laboratory transporting compartments can be inserted into diagnostics laboratory transporting compartment holders manually or the insertion is mediated by an automated diagnostics laboratory transporting compartment handling or sorting device. In semi-automated laboratories, the diagnostics laboratory transporting compartments and their corresponding holders are transferred manually whereas in fully-automated laboratories, the diagnostics laboratory transporting compartment holders are transported on laboratory conveyor systems in order to distribute the test samples and test reagents to connected stations which can conduct different sample processing steps and tests on a different number of test samples at the same time.

Some test sample processing steps include pipetting operations like the aspiration and/or dispensation of liquid test samples and test reagents out of and/or into the diagnostics laboratory transporting compartment using a pipetting device. For these pipetting operations an accurate vertical orientation of the diagnostics laboratory transporting compartment relative to the aspiration/dispensation position of the pipetting device is important as a physical contact between the pipetting device and the diagnostics laboratory transporting compartment can cause test sample cross-contamination, test reagent cross-contamination, and/or damage of the diagnostics laboratory transporting compartment or pipetting device.

However, as diagnostics laboratory transporting compartments are often manually inserted into the diagnostics laboratory transporting compartment holders and the flexible adaptors of the diagnostics laboratory transporting compartment holders have at least small insertion variability, diagnostics laboratory transporting compartments have not always a vertical but a tilted orientation in the diagnostics laboratory transporting compartment holder. Moreover, a shift of the vertical orientation of the diagnostics laboratory transporting compartment can be caused by improper manual transport as well as by uneven or impure surfaces of laboratory conveyor systems. In addition, as transportation paths of conveyor systems also possesses some tolerances, the diagnostics laboratory transporting compartment holders are not always properly centered relative to the aspiration/dispensation positions of pipetting devices or handle positions of handling devices.

Therefore, there is a need to center diagnostics laboratory transporting compartments of different dimensions and their corresponding holders in a simple, reliable and cost-efficient way for delicate test sample processing steps as well as to improve conventional centering mechanisms, particularly to better serve the needs of automated in vitro diagnostic test sample processing.

SUMMARY

According to the present disclosure, a centering unit, a laboratory system and a method for centering one or multiple diagnostics laboratory transporting compartments of different dimensions are disclosed. The centering unit for diagnostics laboratory transporting compartment can comprise at least two support parts which can be fixed on a frame opposite each other. The centering unit for diagnostics laboratory transporting compartment can further comprise at least two arms. Each of the at least two arms can comprise a first arm member and a second arm member connected to each other pivotally with a respective joint. In the middle region of the first arm member, each arm can be connected pivotally about a pivot point on each support part. At the end portion opposite to the joint connection of each first arm member of the at least two arms, a gripper can be attached. The middle of the distance between the grippers can determine a vertical axis of a centering position. The distance between the gripper and the pivot point of each arm can be the same. The centering unit for diagnostics laboratory transporting compartment can further comprise a connector on which the end portion opposite to the joint connection of each second arm member can be connected pivotally about at least one pivot point and the connector can be connected movably on a guiding element. The centering unit for diagnostics laboratory transporting compartment can further comprise an elastic member which can be connected with the connector and a further connector. The further connector can be connected movably on the guiding element. The centering unit for diagnostics laboratory transporting compartment can further comprise an actuator coupled to the further connector.

A laboratory system is also presented. The laboratory system can comprise at least one centering unit for diagnostics laboratory transporting compartment as described herein, at least one diagnostics laboratory transporting compartment holder having one or more flexible adaptors configured to receive at least one diagnostics laboratory transporting compartment of different dimensions, and at least one diagnostics laboratory transporting compartment. The at least one diagnostics laboratory transporting compartment can be a vessel comprising a test sample and can be inserted in the diagnostics laboratory transporting compartment holder.

A method for centering a diagnostics laboratory transporting compartment using a centering unit for diagnostics laboratory transporting compartment as described herein is also presented. The method can comprise moving the further connector away from the pivot points of the at least two arms resulting in a rotation of each of the at least two arms thereby positioning the grippers to a diagnostics laboratory transporting compartment receiving and releasing position; moving a diagnostics laboratory transporting compartment between the grippers; moving the further connector towards the pivot points of the at least two arms resulting in a rotation of each of the arms thereby moving the grippers towards the vertical axis of the centering position, wherein the grippers press from opposite sides on the diagnostics laboratory transporting compartment to align the longitudinal axis of the diagnostics laboratory transporting compartment with the vertical axis of the centering position; repeating the first step to release the diagnostics laboratory transporting compartment; and removing the diagnostics laboratory transporting compartment between the grippers.

A centering unit for diagnostics laboratory transporting compartment is also presented. The centering unit can comprise at least two hinged arms with grippers at one end portion each. The at least two hinged arms can be mounted pivotally and opposite each other on a frame. The centering unit for diagnostics laboratory transporting compartment can further comprise a connector to which each of the other end portions of the hinged arms can be connected pivotally and the connector can be movably connected on a guiding element. The centering unit for diagnostics laboratory transporting compartment can comprise a further connector. The further connector and the connector can be resiliently connected to each other with an elastic member and the further connector can be movably connected on the guiding element. The centering unit for diagnostics laboratory transporting compartment can comprise also an actuator for moving the further connector.

A laboratory system can comprise at least one centering unit for diagnostics laboratory transporting compartment as described herein, at least one diagnostics laboratory transporting compartment holder having one or more flexible adaptors configured to receive at least one diagnostics laboratory transporting compartment of different dimensions, and at least one diagnostics laboratory transporting compartment. The at least one diagnostics laboratory transporting compartment can be a vessel comprising a test sample and can be inserted in the diagnostics laboratory transporting compartment holder.

A method for centering a diagnostics laboratory transporting compartment using a centering unit for diagnostics laboratory transporting compartment as described herein is also presented. The method can comprise moving the further connector to a first moving direction, thereby extending the at least two hinged arms and positioning the grippers to a diagnostics laboratory transporting compartment receiving and releasing position; moving a diagnostics laboratory transporting compartment between the grippers; moving the further connector to a second moving direction, thereby flexing the at least two hinged arms and moving the grippers towards the vertical axis of the centering position, wherein the grippers press from opposite sides on the diagnostics laboratory transporting compartment to align the longitudinal axis of the diagnostics laboratory transporting compartment with the vertical axis of the centering position; repeating the first step to release the diagnostics laboratory transporting compartment; and removing the diagnostics laboratory transporting compartment between the grippers.

Accordingly, it is a feature of the embodiments of the present disclosure to center diagnostics laboratory transporting compartments of different dimensions and their corresponding holders in a simple, reliable and cost-efficient way for delicate test sample processing steps as well as to improve conventional centering mechanisms, particularly to better serve the needs of automated in vitro diagnostic test sample processing. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 2A illustrates side views of connected centering units for diagnostics laboratory transporting compartment where the grippers of the centering units for diagnostics laboratory transporting compartment are in a diagnostics laboratory transporting compartment receiving and releasing position according to an embodiment of the present disclosure.

FIG. 2B illustrates side views of connected centering units for diagnostics laboratory transporting compartment where the diagnostics laboratory transporting compartments with same diameters and heights are centered by the grippers of the connected centering units for diagnostics laboratory transporting compartment according to an embodiment of the present disclosure.

FIG. 2C illustrates side views of connected centering units for diagnostics laboratory transporting compartment where diagnostics laboratory transporting compartments with different diameters are centered by the grippers of the connected centering units for diagnostics laboratory transporting compartment according to an embodiment of the present disclosure.

DETAILED DESCRIPTION

Figures 1A, 1B:
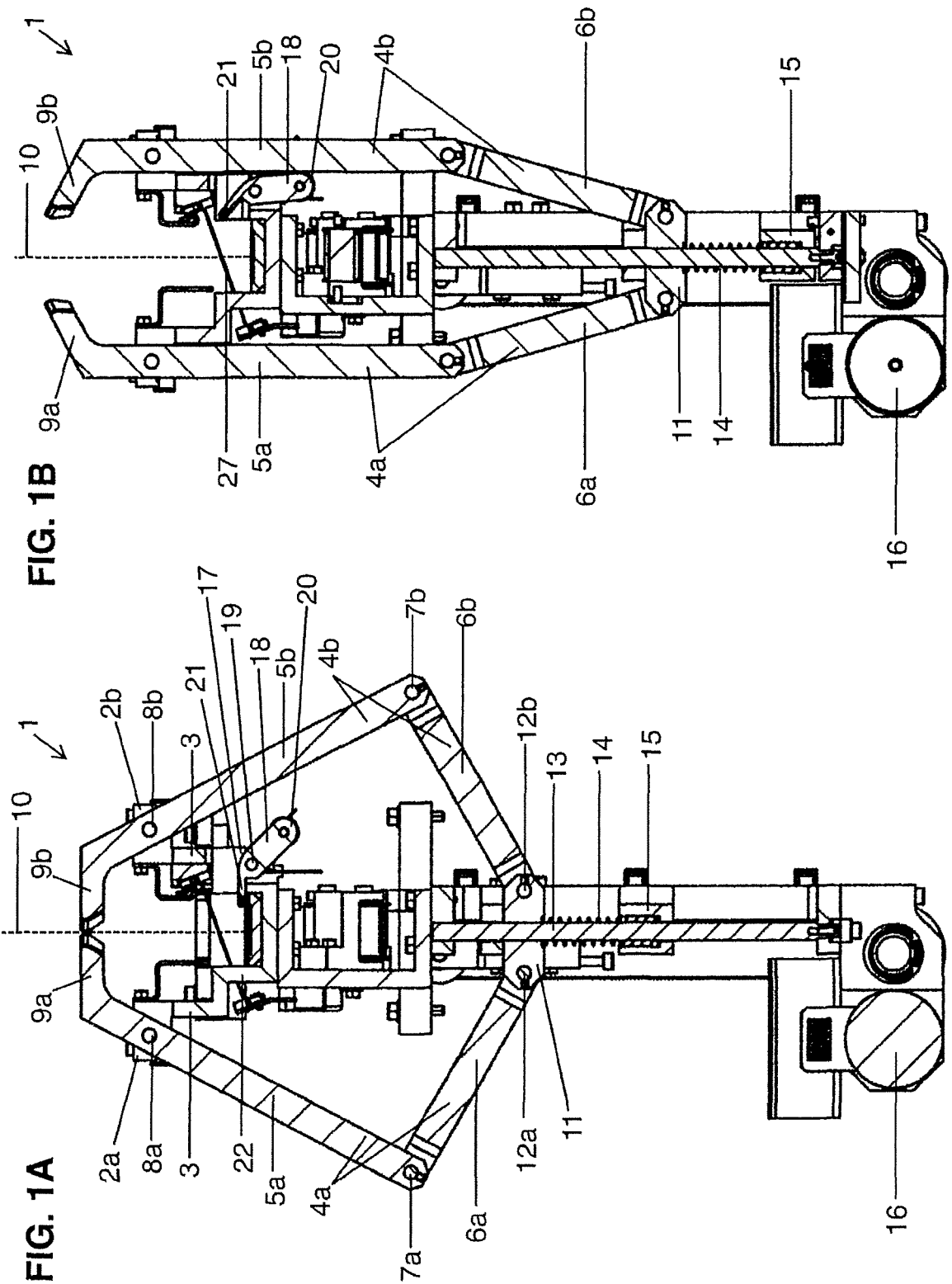
FIG. 1A illustrates a cross section of the centering unit for diagnostics laboratory transporting compartment having the grippers in a centering position according to an embodiment of the present disclosure.
FIG. 1B illustrates a cross section of the centering unit for diagnostics laboratory transporting compartment having the grippers in a diagnostics laboratory transporting compartment receiving and releasing position according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A centering unit for diagnostics laboratory transporting compartment is presented. The centering unit for diagnostics laboratory transporting compartment can comprise at least two support parts which can be fixed on a frame opposite each other. The centering unit for diagnostics laboratory transporting compartment can further comprise at least two arms. Each of the at least two arms can comprise a first arm member and a second arm member connected to each other pivotally with a respective joint. In the middle region of the first arm member, each arm can be connected pivotally about a pivot point on each support part. At the end portion opposite to the joint connection of each first arm member of the at least two arms, a gripper can be attached. The middle of the distance between the grippers can determine a vertical axis of a centering position. The distance between the gripper and the pivot point of each arm can be the same. The centering unit for diagnostics laboratory transporting compartment can further comprise a connector on which the end portion opposite to the joint connection of each second arm member can be connected pivotally about at least one pivot point and the connector can be connected movably on a guiding element. The centering unit for diagnostics laboratory transporting compartment can further comprise an elastic member which can be connected with the connector and a further connector. The further connector can be connected movably on the guiding element. The centering unit for diagnostics laboratory transporting can compartment further comprise an actuator coupled to the further connector.

An advantage of this centering unit for diagnostics laboratory transporting compartment can be that the at least two arms can be connected with a single movable connector enabling a synchronized rotation of the two arms for a more reliable and better centering of diagnostics laboratory transporting compartments relative to an aspiration and/or dispensation position of a pipetting device or to a handle position of a handling device.

As used herein, the term "centering" can relate to a process where the longitudinal axis of the diagnostics laboratory transporting compartment and/or diagnostics laboratory transporting compartment holder can be aligned with the vertical axis of a centering position. The vertical axis of the centering position can, in turn, be aligned with the aspiration/dispensation position of a pipetting device and/or handling position of a handling or sorting device. The pipetting device or the diagnostics laboratory transporting compartment handling device can be part of a pre-analytical, analytical, or post-analytical station. A pre-analytical station can usually be used for the preliminary processing of test samples or sample tubes. An analytical station can be designed, for example, to use a test sample or part of the test sample and a test reagent in order to produce a measurable signal, on the basis of which it is possible to determine whether the analyte is present, and if so in what concentration. A post-analytical station can usually be used for the post-processing of test samples like the archiving of test samples. The pre-analytical, analytical and post-analytical stations may comprise, for example, at least one station from the group of following stations: a sorting station for sorting test samples or test sample tubes, a cap removal station for removing caps or closures on sample tubes, a cap fitting station for fitting caps or closures on sample tubes, a pipetting station for pipetting a sample, an aliquoting station for aliquoting samples, a centrifuging station for centrifuging samples, an analyzer for analyzing an sample, an archiving station for archiving samples, a sample tube type determination station for determining a sample tube type, a sample quality determination station for determining a sample quality.

As used herein, the term "centering unit" can relate to a device which can conduct a centering process where the longitudinal axis of the diagnostics laboratory transporting compartment and/or diagnostics laboratory transporting compartment holder can be aligned with the vertical axis of a centering position.

In one embodiment, the centering unit for diagnostics laboratory transporting compartment can comprise a frame which can be a stationary basis, or scaffold, which can be non-movable with respect to the surroundings at least during operation of the centering unit for diagnostic laboratory transporting compartment. The frame can be adapted to fix support parts rigidly (e.g. welded, bolted, etc.) in order to position the support parts in a three-dimensional space within or outside the frame. The frame can comprise one piece or multiple pieces interconnected to each other. The frame can be made of any suitable material which can provide a sufficient rigidity (e.g. metal, plastic, etc.). The frame can be connected to other frames of centering units for diagnostics laboratory transporting compartment or other systems such as conveyor, pre-analytical, analytical and post-analytical systems.

In one embodiment, the frame can form a sluice comprising a bottom and two opposing side walls which can encompass a transportation channel for diagnostics laboratory transporting compartments. One of the side walls can be open for providing access to a transportation channel. The bottom can be configured to accommodate a diagnostics laboratory transporting compartment conveyor.

In another embodiment, the frame can be part of a rigid chassis of a centering unit or connected systems such as pre-analytical, analytical and post-analytical systems.

In another embodiment, the frame can be part of a rigid housing of a centering unit or connected systems such as pre-analytical, analytical and post-analytical systems.

In one embodiment, the centering unit for diagnostics laboratory transporting compartment can comprise at least two support parts which can be fixed on the frame opposite each other in a minimum distance so that at least one diagnostics laboratory transporting compartment can be positioned between the two support parts. A support part can be a carrier element on which at least one other part can be connected movably (e.g. connected with pivot points, joints, etc.) or non-movably (e.g. welded, bolted, etc.) in order to position the at least one other part in a three-dimensional space within or outside the frame.

In one embodiment, the frame and the support parts can be molded as a single piece. This can improve the rigidity of the centering unit and therefore improve the accuracy of the centering of diagnostics laboratory transporting compartments.

In one embodiment, the centering unit for diagnostics laboratory transporting compartment can comprise two arms with grippers positioned opposite each other and forming an arm pair. The middle of the distance between the grippers can determine a vertical axis of a centering position. The grippers of the arm pair can be positioned to a receiving and releasing position and to a centering position. In the receiving and releasing position, the distance between the two grippers can be large enough for moving and/or re-moving the diagnostics laboratory transporting compartment and/or diagnostics laboratory transporting compartment holder between the two grippers. In the centering position, the two grippers can press evenly from opposite sides towards the vertical axis of the centering position. If a diagnostics laboratory transporting compartment is positioned between the two grippers, the two grippers can press evenly from opposite sides on the diagnostics laboratory transporting compartment thereby centering the diagnostics laboratory transporting compartment.

In one embodiment, each arm of the at least two arms can comprise a first arm member and a second arm member. The first arm member can have a different or same shape and/or dimensions (e.g. length, diameter, width etc.) compared to the second arm member. The first and a second arm member which can be made of any suitable material with sufficient rigidity (e.g. metal or plastic) can be connected to each other pivotally with a respective joint.

In one embodiment, the respective joint can be a pin joint enabling the first and second arm member to pivot towards and away from each other and thereby flexing and extending the two arms.

In one embodiment, each of the two arms can be connected pivotally about a pivot point on each of the two support parts in the middle region of the first arm member of each of the two arms.

In one embodiment, the distance between the gripper and the pivot point of each of the at least two arms and the distance between the pivot point and the respective joint of each of the at least two arms can have a ratio between 1 and 0.1. An advantage of this arrangement can be that long rotary motions of the first and second arm member can be converted into short and more precise gripper movements. Accordingly, manufacturing tolerances of the first and second arm members can be compensated resulting in a more accurate centering of the laboratory transporting compartment.

In one embodiment, each arm can also comprise a gripper which can be attached at the end portion opposite to the joint connection of the first arm member in an angle so that the gripper can be horizontally positioned when the gripper is in a centering position.

In one embodiment, the positions of the grippers relative to the height of the diagnostics laboratory transporting compartment can be selected so that a reliable test sample processing can be possible.

In one embodiment, the grippers can be configured to grip the diagnostics laboratory transporting compartment at least 20% of the height of the laboratory transporting compartment below the top opening in order to reliably process test samples by avoiding contamination by the grippers. Additionally, the size of gripper contact points, lines or areas relative to surface of the diagnostics laboratory transporting compartment can be as small as possible so that the risk of damaging attached barcodes or RFID tags can be minimized.

In one embodiment, the grippers of the at least two arms can be bifurcated. Each bifurcated gripper can comprise two symmetrically connected fingers of the same length and having an angle between 1° and 179° degrees to each other, wherein the two fingertips can be horizontally positioned when the gripper is in the centering position. The two fingers can have a straight or curved shape or a combination thereof. One example of a bifurcated gripper with two straight fingers and an angle of 90° to each other can be a V-shaped gripper which can contact the diagnostics laboratory transporting compartment at two separate contact points. Depending on the range of dimensions of the diagnostics laboratory transporting compartment to be centered, the angle between the two fingers can be selected. The larger the dimensions of the diagnostics laboratory transporting compartment, the greater the selected angle. The contact point between the gripper and the diagnostics laboratory transporting compartment can be increased by fingers having curved shapes which improve the centering stability. Bifurcated grippers can be advantageous for aligning the longitudinal axis of a cylindrical diagnostics laboratory transporting compartment with the vertical axis of the centering position.

In another embodiment, the grippers can be flat clamps which contact the diagnostics laboratory transporting compartment at two opposite contact lines or contact areas. Flat clamps can be advantageous for aligning the longitudinal axis of a cubic diagnostics laboratory transporting compartment with the vertical axis of the centering position.

In one embodiment, the vertical axis of a centering position can be determined by the middle of the distance between two opposing grippers. When the grippers are bifurcated, the vertical axis of the centering position can additionally be determined by the middle of the distance between two opposing fingertips of the bifurcated gripper.

In one embodiment, the vertical axis of the centering position can be aligned with an aspiration and/or dispensation position of a pipetting device enabling accurate and safe pipetting operations.

In another embodiment, the vertical axis of the centering position can be aligned with a handle position of a diagnostics laboratory transporting compartment handling device enabling accurate and safe handling operations.

In one embodiment, the distance between the gripper and the pivot point of each arm can be the same within the scope of general manufacturing accuracies of the first arm members. This can assure that the gripper contact points, lines, or areas can be opposite each other relative the vertical axis of the centering position.

In one embodiment, the centering unit for diagnostics laboratory transporting compartment can further comprise a connector on which the two arms can be connected pivotally.

In one embodiment, the end portions opposite to the joint connections of the two second arm members can be connected pivotally about two pivot points on the connector.

In an alternative embodiment, the end portions opposite to the joint connections of the two second arm members can be connected pivotally about one pivot point on the connector.

In one embodiment, the connector can be located underneath the arm pair so that a pipetting device can have direct access to the open top of the diagnostics laboratory transporting compartment when located between the grippers of the arm pair. This can allow safe pipetting when the diagnostics laboratory transporting compartment is positioned between the grippers of the two arms and kept in a centered position.

In one embodiment, the connector can be located underneath the arm pair so that a handling device can have direct access to the top of the diagnostics laboratory transporting compartment when located between the grippers of the arm pair. This can allow safe handling operations when the diagnostics laboratory transporting compartment is positioned between the grippers of the two arms and kept in a centered position.

In one embodiment, the centering unit for diagnostics laboratory transporting can also comprise a guiding element on which the connector can be connected movably. The guiding element can define a first moving direction and a second moving direction, opposite to the first direction, as well as a moving distance of the connector. The bidirectional movements of the connector can be converted into synchronous rotations of the two arms in order to bring the grippers to a receiving and releasing position and centering position. The synchronization of the two arms can thus advantageously center the diagnostics laboratory transporting compartment accurately.

In one embodiment, the bidirectional movements of the connector can be linear downward/upward movements or forward/backward movements.

In one embodiment, the guiding element can be a rod with a centered and vertical orientation relative to the connector for an upward and downward movement of the connector. The upward movement of the connector can result in a rotation of the two arm members to each other. Thereby, the arms can be flexing and the grippers can be moved synchronously towards the ventricle axis of the centering position. The downward movement of the connector can result in a rotation of the two arm members away from each other. Thereby, the arms can be extending and the grippers can be moved synchronously away from the vertical axis of the centering position and to a diagnostics laboratory transporting compartment receiving and releasing position.

In one embodiment, the connector can be made of a material which is heavy enough to move the connector downwards (e.g. iron or heavy alloys) along the guiding element.

In one embodiment, the guiding element can be located underneath the connector in order to provide direct access to the top of the diagnostics laboratory transporting compartment which is located between the grippers.

In one embodiment, the centering unit for diagnostics laboratory transporting can further comprise an elastic member which can be connected with the connector and a further connector. The further connector can be connected movably on the guiding element. The elastic member between the connector and further connector can convert the movement of the further connector into a resilient movement of the connector, the at least two arms, and the grippers. Thus the elastic member connected between the connector and the further connector can compensate for the various dimensions of diagnostics laboratory transporting compartments. Accordingly, the adaptation and centering of the diagnostics laboratory transporting compartments of different dimensions can depend on a single elastic member. This can allow an accurate and reliable centering of the diagnostics laboratory transporting compartment for a long operation time in a challenging environment, where hundreds of diagnostics laboratory transporting compartments per day have to be centered, with minimized maintenance activities and costs as well as reduced operation downtimes as no unequal deteriorations of two separate or multiple elastic members can occur.

In one embodiment, the elastic member can be a spring. The spring can be a linear spring and can wrap the guiding element.

In one embodiment, the further connector can be connected movably on the guiding element. In order to provide direct access to the top of the diagnostics laboratory transporting compartment when located between the grippers, the further connector can be connected movably on the guiding element underneath the connector.

In one embodiment, the further connector can comprise an upper element and lower element which can be connected to each other and can encompass the connector from above and below relative the guiding element. The upper element of the further connector can support the downward movement of the connector when the further connector is moving downwards.

In one embodiment, the centering unit for diagnostics laboratory transporting can further comprise an actuator coupled to the further connector. The actuator can move the further connector of the centering unit along the guiding element to a first moving direction and a second moving direction, opposite to the first direction. The actuator can be an electric motor having an actively rotated rotor which can be coupled to the further connector with a toothed belt.

In one embodiment, the centering unit for diagnostics laboratory transporting compartment can comprise at least one further support part, a further arm with gripper, and a counterpart for aligning the longitudinal axis of the diagnostics laboratory transporting compartment holder with the vertical axis of the centering position. The at least one further support part can be fixed on the frame or on a further frame between one of the at least two support parts and the guiding element. The further arm can be connected pivotally about a pivot point on the further support part with a further elastic member. The further arm can have an exposed end and a further gripper which can be attached to the end portion opposite to the exposed end and located between one of the grippers of the at least two arms and the guiding element. The counterpart can be fixed on the frame or on the further frame opposite to the further gripper when the further gripper is in a centering position.

In one embodiment, the exposed end of the further arm can be positioned within a planar triangle defined by the first arm member and the second arm member of one of the at least two arms. With this arrangement, the one of the at least two arms can press on the exposed end of the further arm when the one arm extends by rotating the two arm members of the one arm away from each other. The resulting pressure on the exposed end can result in a rotation of the further arm and thereby positioning the further gripper to a diagnostics laboratory transporting compartment holder receiving and releasing position. Through the rotation of the further arm, a tension on the further elastic member can build. When the two arm members of the one arm are rotated towards each other and the one arm is flexed, the exposed end of the further arm can be released resulting in a tension relaxation of the further elastic member and the further gripper can be moved towards the ventricle axis of the centering position. As the one of the two arms controls the rotary motions of the further arm and the positioning of the further gripper, the centering unit for diagnostics laboratory transporting compartment can advantageously center the diagnostics laboratory transporting compartment and its corresponding diagnostics laboratory transporting compartment holder with a single actuator at the same time.

In one embodiment, the further elastic member can be a torsion spring.

In one embodiment, the further gripper can be a bifurcated gripper. This can be advantageous for aligning the longitudinal axis of a cylindrical diagnostics laboratory transporting compartment holder with the vertical axis of the centering position.

In an alternative embodiment, the further gripper can be a flat clamp. This can be advantageous for aligning the longitudinal axis of a cubic diagnostics laboratory transporting compartment holder with the vertical axis of the centering position.

In one embodiment, the centering unit for diagnostics laboratory transporting compartment can further comprise a counterpart which can be used to support the centering of the diagnostics laboratory transporting compartment holder. The counterpart can be fixed on the frame or on the further frame opposite to the further gripper when the further gripper is in a centering position. The counterpart and the further gripper can have a second minimum distance to each other so that at least one diagnostics laboratory transporting compartment holder can be positioned between the further gripper and the counterpart. The usage of a simple counterpart can be advantageous when standardized diagnostics laboratory transporting compartments of same dimensions have to be centered.

In an embodiment, the counterpart can be substituted by a second further support part and a second further arm with a further gripper.

In one embodiment, the further arm and the second further arm can be located opposite each other for aligning the longitudinal axis of the diagnostics laboratory transporting compartment holder of different dimensions with the vertical axis of the centering position. The counterpart can comprise a second further support part which can be fixed on the frame or on the further frame between one of the at least two support parts and the guiding element. The counterpart can comprise a second further arm which can be connected pivotally about a pivot point on the second further support part with a further elastic member. The second further arm can have an exposed end and a further gripper which can be attached to the end portion opposite to the exposed end and located between one of the grippers of the at least two arms and the guiding element. The middle of the distance between the further grippers of the further arm and the second further arm can determine a vertical axis of the centering position. The distance between the further gripper and the pivot point of each of the further arm and second further arm can be the same within the scope of general manufacturing accuracies of the further arms. This can assure that the contact points, lines, or areas of the two further grippers on the surface of the diagnostics laboratory transporting compartment holder are opposite each other relative to the longitudinal axis of the diagnostics laboratory transporting compartment holder.

In one embodiment, the exposed end of the second further arm can be positioned within a planar triangle defined by the first arm member and the second arm member of one of the at least two arms. With this arrangement, one of the at least two arms can press on the exposed end of the second further arm when the one arm extends by rotating the two arms members of the one arm away from each other. The resulting pressure on the exposed end can result in a rotation of the second further arm and thereby positioning the further gripper to a diagnostics laboratory transporting compartment holder receiving and releasing position. Through the rotation of the second further arm, a tension on the further elastic member can build. When the two arm members of the one arm are rotated towards each other and the one arm is flexed, the exposed end of the second further arm can be released resulting in a tension relaxation of the further elastic member and the further gripper can be moved towards the ventricle axis of the centering position. With this arrangement, the at least two arms can control the rotary motions of the further arm and the second further arm and the positioning of the two further grippers. Accordingly, the centering unit for diagnostics laboratory transporting compartment can advantageously center diagnostics laboratory transporting compartments of different dimensions and diagnostics laboratory transporting compartment holders of different dimensions with one a single actuator at the same time.

In one embodiment, the further elastic member of the second further arm can be a torsion spring.

In one embodiment, the further gripper of the second further arm can be a bifurcated gripper. This can be advantageous for aligning the longitudinal axis of a cylindrical diagnostics laboratory transporting compartment holder of different dimensions with the vertical axis of the centering position.

In an alternative embodiment, the further gripper of the second further arm can be a flat clamp. This can be advantageous for aligning the longitudinal axis of a cubic diagnostics laboratory transporting compartment holder of different dimensions with the vertical axis of the centering position.

In one embodiment, the centering unit for diagnostics laboratory transporting compartment can further comprise a light barrier adapted to detect an interruption of a light beam caused by a diagnostics laboratory transporting compartment or diagnostics laboratory transporting compartment holder when moved between the at least two arms. The interruption of a light beam can generate a signal which can be transmitted to a control device comprising a computing device adapted to execute software which can be configured to interpret the signal and to send commands to the actuator in order to move the further connector of the centering unit for diagnostics laboratory transporting compartment. One interpretation of the signal can be that the diagnostics laboratory transporting compartment holder is positioned between the two grippers and the actuator can move the further connector in order to position the two grippers in a centering position.

In one embodiment, the centering unit for diagnostics laboratory transporting compartment can further comprise a stopper configured to stop a diagnostics laboratory transporting compartment holder transported on a diagnostics laboratory transporting compartment conveyor. The stopper can be a pivoted barrier which can be fixed on the frame or on the further frame with a substantially perpendicular orientation relative to the transportation path of the diagnostics laboratory transporting compartment conveyor for blocking and releasing the transportation path of a diagnostics laboratory transporting compartment holder. As a result, the diagnostics laboratory transporting compartment holder can be kept stationary relative to the centering unit for diagnostics laboratory transporting compartment so that the grippers can center the diagnostics laboratory transporting compartments and diagnostics laboratory transporting compartment holders.

In one embodiment, the centering unit for diagnostics laboratory transporting compartment can be connected to at least one further centering unit for diagnostics laboratory transporting compartment. The further connectors of each centering unit for diagnostics laboratory transporting compartment can be connected to a common connector. The common connector can be connected movably on at least two guiding elements and coupled to the actuator.

In one embodiment, the number of connected centering units for diagnostics laboratory transporting compartment can be equal to the number of aspiration/dispensation positions of a pipetting device and/or handling positions of a diagnostics laboratory transporting compartment handling device. Accordingly, it can be possible to actuate a plurality of arm pairs and thereby centering multiple diagnostics laboratory transporting compartments and/or diagnostics laboratory transporting compartment holders with a single actuator at the same time. Furthermore, with this arrangement, the further arms of the connected centering units for diagnostics laboratory transporting compartment can center together test sample tube racks or test reagent cassette racks.

In a further embodiment, the common connector can be coupled to an extended actively rotated rotor of the actuator via two tooth belts located at each end of the common connector. With this configuration, the guidance and movement of the common connector can be optimized.

In one embodiment, the common connector can be connected movably on an extra guiding element which can define a third moving direction and a fourth moving direction, opposite to the third direction, as well as the moving distance of the common connector, wherein the third moving direction of the extra guiding element can be substantially parallel to the first moving direction of the guiding element and the fourth moving direction of the extra guiding element can be substantially parallel to the second moving direction of the guiding element. The extra guiding element supports can further optimize the guidance and movement of the common connector.

In one embodiment, the extra guiding element can comprise two substantially parallel rails or notches with a defined length which can encompass the common connector.

In one embodiment, the common connector can comprise an upper element and a lower element which can be connected to each other and can encompass the connectors of each centering unit above and below relative the guiding elements. The upper element of the common connector can support the downward movements of the connectors of each centering unit when the common connector is moving downwards.

A laboratory system can comprise at least one centering unit for diagnostics laboratory transporting compartment as described herein, at least one diagnostics laboratory transporting compartment holder having one or more flexible adaptors configured to receive at least one diagnostics laboratory transporting compartment of different dimensions, and at least one diagnostics laboratory transporting compartment. The at least one diagnostics laboratory transporting compartment can be a vessel comprising a test sample and can be inserted in the diagnostics laboratory transporting compartment holder.

As used herein, the term "diagnostics laboratory transporting compartment holder" can relate to any device adapted for receiving, holding, transporting, and/or releasing at least one diagnostics laboratory transporting compartment.

In one embodiment, the diagnostics laboratory transporting compartment holder can have a cylindrical shape, a closed bottom, and an open top with an insertion area for inserting one diagnostics laboratory transporting compartment in an upright position. The diagnostics laboratory transporting compartment holder can possess a longitudinal axis substantially perpendicular to and in the midpoint of its horizontal cross section. One example of such a cylindrical diagnostics laboratory transporting compartment holder can be a single sample tube holder.

In another embodiment, the diagnostics laboratory transporting compartment holder can have a cubic shape, a closed bottom, and a top with one or multiple insertion areas for inserting one or multiple diagnostics laboratory transporting compartments in an upright position. The cubic holder can possess one or multiple longitudinal axis in the midpoints of the one or multiple insertion areas and substantially perpendicular to its horizontal cross section. One example of such a cubic diagnostics laboratory transporting compartment holder can be test sample tube rack. Another example of such a cubic diagnostics laboratory transporting compartment holder can be a reagent cassette rack.

In one embodiment, the insertion areas of the diagnostics laboratory transporting compartment holders can comprise a flexible adapter configured to receive diagnostics laboratory transporting compartments of different dimensions.

As used herein, the term "diagnostics laboratory transporting compartment" can relate to a vessel adapted for receiving, storing, transporting, and/or releasing a content such as a test sample (e.g. blood, urine, serum, plasma, or liquefied biopsy sample, etc.), a test reagent (e.g. reagent for immunochemistry tests, clinical chemistry tests coagulation tests, hematological tests, molecular biological tests, etc.), or a combination thereof. Depending on the content of the diagnostics laboratory transporting compartment, sample processing step, and manufacturer the material as well as the dimension of the diagnostics laboratory transporting compartment like diameter, side length, height and geometry can vary.

In one embodiment, the diagnostics laboratory transporting compartment can be a vessel with a cylindrical shape, a closed bottom, and an open top, wherein the cylindrical vessel can possess a longitudinal axis substantially perpendicular to and in the midpoint of its horizontal cross section. Alternatively, the closed bottom of the cylindrical vessel can be rounded. One example of such a cylindrical diagnostics laboratory transporting compartment can be a vessel comprising a test sample.

In another embodiment, the diagnostics laboratory transporting compartment can be a vessel with a cubic shape, a closed bottom, and a top with one or multiple pipetting openings. The cubic vessel can possess one or multiple longitudinal axis in the midpoints of the one or multiple pipetting openings and substantially perpendicular to its horizontal cross section. One example of such a cubic diagnostics laboratory transporting compartment can be a reagent cassette comprising a test reagent. Another example of such a cubic diagnostics laboratory transporting compartment can be a reaction cuvette comprising a test sample or a test reagent or a mixture thereof.

In one embodiment, the diagnostics laboratory transporting compartment can be equipped with a cap or lid, either connected to the diagnostics laboratory transporting compartment or provided independently.

In one embodiment, the laboratory system can further comprise a pipetting device having at least one aspiration and/or dispensation position. The at least one aspiration and/or dispensation position can be aligned with the vertical axis of the centering position of the at least one centering unit for diagnostics laboratory transporting compartment. With this arrangement, an accurate and safe pipetting of samples and/or reagents can be assured.

In another embodiment, the laboratory system can further comprise a handling device having at least one handling position. The at least one handle position can be aligned with the vertical axis of the centering position of the at least one centering unit for diagnostics laboratory transporting compartment. With this arrangement, an accurate and safe handling of laboratory transporting compartments can be assured.

In one embodiment, the pipetting device and/or the handling device can be part of a pre-analytical, analytical, or post-analytical station.

In one embodiment, the laboratory system can further comprise a diagnostics laboratory transporting compartment conveyor which can be capable of being operatively coupled to a laboratory conveyor system. Accordingly, the diagnostics laboratory transporting compartment conveyor can receive and release diagnostics laboratory transporting compartments from/to the laboratory conveyor system which can be connected with stations such as pre-analytical, analytical and/or post-analytical stations of a laboratory system in order to move and remove the diagnostics laboratory transporting compartment between the grippers.

In one embodiment, the diagnostics laboratory transporting compartment conveyor can be part of the laboratory conveyor system.

In one embodiment, the laboratory conveyor system can further comprise a stopper located in front of the at least one centering unit for diagnostics laboratory transporting compartment and configured to stop a diagnostics laboratory transporting compartment holder transported on a laboratory conveyor system. The stopper can be a pivoted barrier with a substantially perpendicular orientation relative to the transportation path of the laboratory conveyor system for blocking and releasing the transportation path of a diagnostics laboratory transporting compartment holder. As a result, the diagnostics laboratory transporting compartment can be kept stationary on the laboratory conveyor system so that a defined number of following diagnostics laboratory transporting compartments can catch up with the first the diagnostics laboratory transporting compartment holder and a group of diagnostics laboratory transporting compartments can be transported further to the at least one centering unit for diagnostics laboratory transporting compartment.

A method for centering a diagnostics laboratory transporting compartment using a centering unit for diagnostics laboratory transporting compartment as described herein can comprise the following steps: moving the further connector away from the pivot points of the at least two arms resulting in a rotation of each of the at least two arms thereby positioning the grippers to a diagnostics laboratory transporting compartment receiving and releasing position; moving a diagnostics laboratory transporting compartment between the grippers; moving the further connector towards the pivot points of the at least two arms resulting in a rotation of each of the arms thereby moving the grippers towards the vertical axis of the centering position, wherein the grippers press from opposite sides on the diagnostics laboratory transporting compartment to align the longitudinal axis of the diagnostics laboratory transporting compartment with the vertical axis of the centering position; repeating the first step to release the diagnostics laboratory transporting compartment; and removing the diagnostics laboratory transporting compartment between the grippers.

The method can be conducted briefly before a sample processing step like the pipetting of a test sample is initiated. As the centering unit for diagnostics laboratory transporting compartment can provide direct access to the open top of the diagnostics laboratory transporting compartment, the method can be conducted right in front of or at the pipetting device. The laboratory transporting compartment can even be kept in the centering position by the grippers of the centering unit during pipetting of the sample which improves significantly the safety of the sample processing step.

During the moving of the further connector towards the pivot points of the at least two arms resulting in a rotation of each of the arms thereby moving the grippers towards the vertical axis of the centering position, the grippers can press from opposite sides on the diagnostics laboratory transporting compartment and align the longitudinal axis of the diagnostics laboratory transporting compartment with the vertical axis of the centering position. The grippers can press from opposite sides equally on the diagnostics laboratory transporting compartment as both grippers can be resiliently coupled to the same elastic member via the connector. This can improve the centering accuracy as well as the centering reliability of diagnostics laboratory transporting compartments having different dimensions as manufacturing tolerances of multiple elastic members can be prevented. The accurate centering of the diagnostics laboratory transporting compartment can avoid any contact between the diagnostics laboratory transporting compartment and pipetting devices during pipetting operations usually performed in the process of test sample analysis. Hence, a major advantage of the accurate and reliable centering can be that any test sample cross-contaminations and damages of diagnostics laboratory transporting compartments and pipetting devices can be avoided and test sample analysis results can be provided in the required quality and time.

In one embodiment, the method for centering a diagnostics laboratory transporting compartment can further comprise the following steps during the moving of the further connector away from the pivot points of the at least two arms resulting in a rotation of each of the at least two arms thereby positioning the grippers to a diagnostics laboratory transporting compartment receiving and releasing position and the moving of the further connector towards the pivot points of the at least two arms resulting in a rotation of each of the arms thereby moving the grippers towards the vertical axis of the centering position for centering a diagnostics laboratory transporting compartment holder:

During moving the further connector away from the pivot points of the at least two arms resulting in a rotation of each of the at least two arms thereby positioning the grippers to a diagnostics laboratory transporting compartment receiving and releasing position, at least one of the rotating arms can press on the exposed end of the further arm resulting in a rotation of the further arm thereby positioning the further gripper of the further arm to a diagnostics laboratory transporting compartment holder receiving and releasing position. And the rotation of the further arm can build tension on the further elastic member.

During the moving of the further connector towards the pivot points of the at least two arms resulting in a rotation of each of the arms thereby moving the grippers towards the vertical axis of the centering position, the one of the rotating arms can release the exposed end of the further arm resulting in a tension relaxation of the further elastic member and a rotation of the further arm thereby moving the further gripper towards the vertical axis of the centering position. The gripper can press on the diagnostics laboratory transporting compartment holder and on the counterpart to align the longitudinal axis of the diagnostics laboratory transporting compartment holder with the longitudinal axis of the centering position.

In one embodiment of the method, the longitudinal axis of the diagnostics laboratory transporting compartment holder can be aligned with the vertical axis of the centering position before the longitudinal axis of the diagnostics laboratory transporting compartment is aligned with the vertical axis of the centering position and can be released after the diagnostics laboratory transporting compartment is released.

In a further embodiment of the method, the moving of the diagnostics laboratory transporting compartment between the grippers of the at least two arms and the removing of the diagnostics laboratory transporting compartment between the grippers of the at least two arms can be mediated by the diagnostics laboratory transporting compartment conveyor.

A centering unit for diagnostics laboratory transporting compartment can comprise at least two hinged arms with grippers at one end portion each. The at least two hinged arms can be mounted pivotally and opposite each other on a frame. The centering unit for diagnostics laboratory transporting compartment can further comprise a connector to which each of the other end portions of the hinged arms can be connected pivotally and the connector can be movably connected on a guiding element. The centering unit for diagnostics laboratory transporting compartment can comprise a further connector. The further connector and the connector can be resiliently connected to each other with an elastic member and the further connector can be movably connected on the guiding element. The centering unit for diagnostics laboratory transporting compartment can also comprise an actuator for moving the further connector.

In one embodiment, the centering unit for diagnostics laboratory transporting compartment can comprise a frame which can be a stationary basis or scaffold which can be non-movable with respect to the surroundings at least during operation of the centering unit for diagnostic laboratory transporting compartment. The frame can be adapted to fix support parts rigidly (e.g. welded, bolted, etc.) in order to position the support parts in a three-dimensional space within or outside the frame. The frame can comprise one piece or multiple pieces interconnected to each other. The frame can be made of any suitable material which can provide a sufficient rigidity (e.g. metal, plastic, etc.). The frame can be connected to other frames of centering units for diagnostics laboratory transporting compartment or other systems such as conveyor, pre-analytical, analytical and post-analytical systems.

In one embodiment, the frame can form a sluice comprising a bottom and two opposing side walls which can encompass a transportation channel for diagnostics laboratory transporting compartments. One of the side walls can be open for providing access to a transportation channel. The bottom can be configured to accommodate a diagnostics laboratory transporting compartment conveyor.

In another embodiment, the frame can be part of a rigid chassis of a centering unit or connected systems such as pre-analytical, analytical and post-analytical systems.

In another embodiment, the frame can be part of a rigid housing of a centering unit or connected systems such as pre-analytical, analytical and post-analytical systems.

In one embodiment, the centering unit for diagnostics laboratory transporting compartment can comprise at least two support parts which can be fixed on the frame opposite each other in a minimum distance so that at least one diagnostics laboratory transporting compartment can be positioned between the two support parts. A support part can be a carrier element on which at least one other part can be connected movably (e.g. connected with pivot points, joints, etc.) or non-movably (e.g. welded, bolted, etc.) in order to position the at least one other part in a three-dimensional space within or outside the frame.

In one embodiment, the frame and the support parts can be molded as a single piece. This can improve the rigidity of the centering unit and therefore can improve the accuracy of the centering of diagnostics laboratory transporting compartments.

In one embodiment, the centering unit for diagnostics laboratory transporting compartment can comprise at least two hinged arms with grippers at one end portion each. The at least two hinged arms can be mounted pivotally and opposite each other on a frame forming an arm pair. The grippers of the arm pair can be positioned to a receiving and releasing position and centering position by flexing and extending each of the at least two hinged arms. In the receiving and releasing position, the distance between the two grippers can be large enough for moving and/or removing the diagnostics laboratory transporting compartment and/or diagnostics laboratory transporting compartment holder between the two grippers. In the centering position, the two grippers can press evenly from opposite sides towards the vertical axis of the centering position. If a diagnostics laboratory transporting compartment is positioned between the two grippers, the two grippers can press evenly from opposite sides on the diagnostics laboratory transporting compartment thereby centering the diagnostics laboratory transporting compartment.

In one embodiment, each of the at least two hinged arms can comprise a first arm member and a second arm member which can be connected to each other pivotally with a respective joint. The first arm member can have a different or same shape and/or dimensions (e.g. length, diameter, width etc.) compared to the second arm member. The first and a second arm member can be made of any suitable material with sufficient rigidity (e.g. metal or plastic). Each hinged arm can also comprise a gripper which can be attached at the end portion opposite to the joint connection of the first arm member in an angle so that the gripper can be horizontally positioned when the gripper is in a centering position.

In one embodiment, the respective joint can be a pin joint enabling the first and second arm member of each hinged arm to pivot towards and away from each other and thereby flexing and extending each of the at last two hinged arms.

In one embodiment, the respective joint can be an elastic joint enabling the first and second arm member of each hinged arm to pivot towards and away from each other and thereby flexing and extending each of the at last two hinged arms.

In one embodiment, the middle region of the first arm member of each hinged arm can be connected pivotally about a pivot point on the frame.

In one embodiment, the distance between the gripper and the pivot point of each of the at least two hinged arms and the distance between the pivot point and the respective joint of each of the at least two hinged arms can have a ratio between 1 and 0.1. An advantage of this arrangement can be that long rotary motions of the first and second arm member can be converted into short and more precise gripper movements. Accordingly, manufacturing tolerances of the first and second arm members can be compensated resulting in a more accurate centering of the laboratory transporting compartment.

In one embodiment, the positions of the grippers relative to the height of the diagnostics laboratory transporting compartment can be selected so that a reliable sample processing is possible.

In one embodiment, the grippers can be configured to grip the diagnostics laboratory transporting compartment at least 20% of the height of the laboratory transporting compartment below the top opening in order to reliably process test samples by avoiding contamination by the grippers. Additionally, the size of gripper contact points, lines or areas relative to surface of the diagnostics laboratory transporting compartment can be as small as possible so that the risk of damaging attached barcodes or RFID tags can be minimized.

In one embodiment, the grippers of the at least two hinged arms can be bifurcated. Each bifurcated gripper can comprise two symmetrically connected fingers of the same length and having an angle between 1° and 179° degrees to each other, wherein the two fingertips can be horizontally positioned when the gripper is in the centering position. The two fingers can have a straight or curved shape or a combination thereof. One example of a bifurcated gripper with two straight fingers and an angle of 90° to each other can be a V-shaped gripper which can contact the diagnostics laboratory transporting compartment at two separate contact points. Depending on the range of dimensions of the diagnostics laboratory transporting compartment to be centered, the angle between the two fingers can be selected. The contact point between the gripper and the diagnostics laboratory transporting compartment can be increased by fingers having curved shapes which can improve the centering stability. Bifurcated grippers can be advantageous for aligning the longitudinal axis of a cylindrical diagnostics laboratory transporting compartment with the vertical axis of the centering position.

In a further embodiment, the grippers of the hinged arms can be flat clamps which can contact the diagnostics laboratory transporting compartment at two opposite contact lines or contact areas. Flat clamps can be advantageous for aligning the longitudinal axis of a cubic diagnostics laboratory transporting compartment with the vertical axis of the centering position.

In one embodiment, the vertical axis of a centering position can be determined by the middle of the distance between two opposing grippers. When the grippers are bifurcated grippers, the vertical axis of the centering position can be additionally determined by the middle of the distance between two opposing fingertips of a bifurcated gripper.

In one embodiment, the vertical axis of the centering position can be aligned with an aspiration and/or dispensation position of a pipetting device enabling accurate and safe pipetting operations.

In another embodiment, the vertical axis of the centering position can be aligned with a handle position of a diagnostics laboratory transporting compartment handling device enabling accurate and safe handling operations.

In one embodiment, the distance between the gripper and the pivot point of each hinged arm can be the same within the scope of general manufacturing accuracies of the first arm members. This can assure that the gripper contact points, lines, or areas are opposite each other relative the vertical axis of the centering position.

In one embodiment, the centering unit for diagnostics laboratory transporting compartment can further comprise a connector on which the two hinged arms can be connected pivotally.

In one embodiment, the end portions opposite to the joint connections of the two second arm members of the hinged arms can be connected pivotally about two pivot points on the connector.

In an alternative embodiment, the end portions opposite to the joint connections of the two second arm members can be connected pivotally about one pivot point on the connector.

In one embodiment, the connector can be located underneath the hinged arms so that a pipetting device or handling device can have direct access to the open top of the diagnostics laboratory transporting compartment which can be located between the grippers of the hinged arms. This can allow pipetting or handling operations when the diagnostics laboratory transporting compartment is positioned between the grippers of the two hinged arms and kept in a centered position.

In one embodiment, the centering unit for diagnostics laboratory transporting can also comprise a guiding element on which the connector can be connected movably. The guiding element can define a first moving direction and a second moving direction, opposite to the first direction, as well as a moving distance of the connector. The bidirectional movements of the connector can be converted into synchronous rotations of the two hinged arms in order to bring the grippers to a receiving and releasing position and centering position. The synchronization of the two hinged arms can thus advantageously center the diagnostics laboratory transporting compartment accurately.

In one embodiment, the bidirectional movements of the connector can be linear downward/upward movements or forward/backward movements.

In one embodiment, the guiding element can be a rod with a centered and vertical orientation relative to the connector for an upward and downward movement of the connector. The upward movement of the connector can result in a flexion of the two hinged arms. Thereby, the grippers can be moved synchronously towards the ventricle axis of the centering position. The downward movement of the connector can result in an extension of the hinged arms.

Thereby, the hinged arms can be extending and the grippers can be moved synchronously away from the vertical axis of the centering position and to a diagnostics laboratory transporting compartment receiving and releasing position.

In one embodiment, the connector can be made of a material which is heavy enough to move the connector downwards (e.g. iron or heavy alloys) along the guiding element.

In one embodiment, the guiding element can be located underneath the connector in order to provide direct access to the top of the diagnostics laboratory transporting compartment which can be located between the grippers.

In one embodiment, the centering unit for diagnostics laboratory transporting can comprise a further connector and an elastic member. The further connector and the connector can be resiliently connected to each other with the elastic member. The further connector and the connector can be connected movably on the guiding element. The elastic member between the connector and further connector can convert the movement of the further connector into a resilient movement of the connector, the at least two hinged arms, and the grippers. Thus, the elastic member connected between the connector and the further connector can compensate the various dimensions of diagnostics laboratory transporting compartments. Accordingly, the adaptation and centering of the diagnostics laboratory transporting compartments of different dimensions can depend on a single elastic member. This can allow for an accurate and reliable centering of the diagnostics laboratory transporting compartment for a long operation time in a challenging environment, where hundreds of diagnostics laboratory transporting compartments per day have to be centered, with minimized maintenance activities and costs as well as reduced operation downtimes as no unequal deteriorations of two separate or multiple elastic members can occur.

In one embodiment, the elastic member can be a spring. The spring can be a linear spring and can wrap the guiding element.

In one embodiment, the further connector can be connected movably on the guiding element. In order to provide direct access to the top of the diagnostics laboratory transporting compartment when located between the grippers, the further connector can be connected movably on the guiding element underneath the connector.

In one embodiment, the further connector can comprise an upper element and lower element which can be connected to each other and encompass the connector from above and below relative the guiding element. The upper element of the further connector can support the downward movement of the connector when the further connector is moving downwards.

In one embodiment, the centering unit for diagnostics laboratory transporting can further comprise an actuator for moving the further connector. The actuator can be an electric motor having an actively rotated rotor which can be coupled to the further connector with a toothed belt.

In one embodiment, the centering unit for diagnostics laboratory transporting can comprise at least one rotatable arm with an exposed end and a further gripper at the end portion opposite to the exposed end. The at least one rotatable arm can be coupled pivotally and opposite to a counterpart on the frame or on a further frame with a further elastic member. The exposed end can be adapted to trigger the rotation of the rotatable arm and movement of the further gripper away from the vertical axis of the centering position.

In one embodiment, the rotatable arm can be coupled pivotally on the frame or on the further frame so that the gripper can be located between one of the grippers of the at least two hinged arms and the guiding element.

In one embodiment, the exposed end can be positioned so that a rotation of the rotatable arm and movement of the further gripper away from the vertical axis of the centering position can be triggered by engagement with one of the at least two hinged arms.

In one embodiment, the exposed end of the rotatable arm can be positioned within a planar triangle defined by the first arm member and the second arm member of one of the at least two hinged arms. With this arrangement, one of the at least two hinged arms can press on the exposed end of the rotatable arm when the one hinged arm extends. The resulting pressure on the exposed end can result in a rotation of the rotatable arm and thereby positioning the further gripper to a diagnostics laboratory transporting compartment holder receiving and releasing position. Through the rotation of the rotatable arm, a tension on the further elastic member can build. When the one hinged arm is flexed, the exposed end of the rotatable arm can be released resulting in a tension relaxation of the further elastic member and the further gripper can be moved towards the ventricle axis of the centering position. As the flexion and extension of the one of the two hinged arms control the rotary motions of the further arm and the positioning of the further gripper, the centering unit for diagnostics laboratory transporting compartment can advantageously center the diagnostics laboratory transporting compartment and its corresponding diagnostics laboratory transporting compartment holder with a single actuator at the same time.

In one embodiment, the further elastic member can be a torsion spring.

In one embodiment, the further gripper can be a bifurcated gripper. This can be advantageous for aligning the longitudinal axis of a cylindrical diagnostics laboratory transporting compartment holder with the vertical axis of the centering position.

In an alternative embodiment, the further gripper can be a flat clamp. This can be advantageous for aligning the longitudinal axis of a cubic diagnostics laboratory transporting compartment holder with the vertical axis of the centering position.

In one embodiment, the centering unit for diagnostics laboratory transporting compartment can further comprise a counterpart which can be used to support the centering of the diagnostics laboratory transporting compartment holder. The counterpart can be fixed on the frame or on the further frame opposite to the further gripper of the rotatable arm when the further gripper is in a centering position. The counterpart and the further gripper can have a second minimum distance to each other so that at least one diagnostics laboratory transporting compartment holder can be positioned between the further gripper and the counterpart. The usage of a simple counterpart can be advantageous when standardized diagnostics laboratory transporting compartments of same dimensions have to be centered.

In an embodiment, the counterpart can be a further rotatable arm with an exposed end and a further gripper as above-described.

In one embodiment, the two rotatable arms with grippers can be located opposite each other for aligning the longitudinal axis of the diagnostics laboratory transporting compartment holder of different dimensions with the vertical axis of the centering position. The counterpart can comprise a rotatable arm which can be connected pivotally about a pivot point on the further support part with a further elastic member. The rotatable arm can have an exposed end and a further gripper which can be attached to the end portion opposite to the exposed end and located between one of the grippers of the at least two arms and the guiding element. The middle of the distance between the grippers of the two rotatable arms can determine a vertical axis of the centering position and the distance between the gripper and the pivot point of each of the two rotatable arms can be the same within the scope of general manufacturing accuracies of the further arms. This can assure that the contact points, lines, or areas of the two further grippers on the surface of the diagnostics laboratory transporting compartment holder are opposite each other relative to the longitudinal axis of the diagnostics laboratory transporting compartment holder. With this arrangement, the flexion and extension of the at least two hinged arms can control the rotary motions of the two rotatable arms and the positioning of the two further grippers. Accordingly, the centering unit for diagnostics laboratory transporting compartment can advantageously center diagnostics laboratory transporting compartments of different dimensions and diagnostics laboratory transporting compartment holders of different dimensions with one a single actuator at the same time.

In one embodiment, the centering unit for diagnostics laboratory transporting compartment can further comprise a light barrier adapted to detect an interruption of a light beam caused by a diagnostics laboratory transporting compartment or diagnostics laboratory transporting compartment holder when moved between the at least two arms. The interruption of a light beam can generate a signal which is transmitted to a control device comprising a computing device adapted to execute software which can be configured to interpret the signal and to send commands to the actuator in order to move the further connector of the centering unit for diagnostics laboratory transporting compartment. One interpretation of the signal can be that the diagnostics laboratory transporting compartment holder is positioned between the two grippers and the actuator can move the further connector in order to position the two grippers in a centering position.

In one embodiment, the centering unit for diagnostics laboratory transporting compartment can further comprise a stopper configured to stop a diagnostics laboratory transporting compartment holder transported on a diagnostics laboratory transporting compartment conveyor. The stopper can be a pivoted barrier which can be fixed on the frame or on the further frame with a substantially perpendicular orientation relative to the transportation path of the diagnostics laboratory transporting compartment conveyor for blocking and releasing the transportation path of a diagnostics laboratory transporting compartment holder. As a result, the diagnostics laboratory transporting compartment holder can be kept stationary relative to the centering unit for diagnostics laboratory transporting compartment so that the grippers can center the diagnostics laboratory transporting compartments and diagnostics laboratory transporting compartment holders.

In one embodiment, the centering unit for diagnostics laboratory transporting compartment can be connected to at least one further centering unit for diagnostics laboratory transporting compartment. The further connectors of each centering unit for diagnostics laboratory transporting compartment can be connected to a common connector. The common connector can be connected movably on at least two guiding elements and coupled to the actuator. The number of connected centering units for diagnostics laboratory transporting compartment can be equal to the number of aspiration/dispensation positions of a pipetting device and/or handling positions of a diagnostics laboratory transporting compartment handling device. Accordingly, it can be possible to actuate a plurality of arm pairs and thereby centering multiple diagnostics laboratory transporting compartments and/or diagnostics laboratory transporting compartment holders with a single actuator at the same time. Furthermore, with this arrangement, the further arms of the connected centering units for diagnostics laboratory transporting compartment can center together test sample tube racks or test reagent cassette racks.

In a further embodiment, the common connector can be coupled to an extended actively rotated rotor of the actuator via two tooth belts located at each end of the common connector. With this configuration, the guidance and movement of the common connector can be optimized.

In one embodiment, the common connector can be connected movably on an extra guiding element which can define a third moving direction and a fourth moving direction, opposite to the third direction, as well as the moving distance of the common connector, wherein the third moving direction of the extra guiding element can be substantially parallel to the first moving direction of the guiding element and the fourth moving direction of the extra guiding element can be substantially parallel to the second moving direction of the guiding element. The extra guiding element supports can further optimize the guidance and movement of the common connector.

In one embodiment, the extra guiding element can comprise two substantially parallel rails or notches with a defined length which can encompass the common connector.

In one embodiment, the common connector can comprise an upper element and a lower element which can be connected to each other and encompass the connectors of each centering unit from above and below relative the guiding elements. The upper element of the common connector can support the downward movements of the connectors of each centering unit when the common connector is moving downwards.

A laboratory system can comprise at least one centering unit for diagnostics laboratory transporting compartment as described herein, at least one diagnostics laboratory transporting compartment holder having one or more flexible adaptors configured to receive at least one diagnostics laboratory transporting compartment of different dimensions, and at least one diagnostics laboratory transporting compartment. The at least one diagnostics laboratory transporting compartment can be a vessel comprising a test sample and can be inserted in the diagnostics laboratory transporting compartment holder.

As used herein, the term "diagnostics laboratory transporting compartment holder" can relate to any device adapted for receiving, holding, transporting, and/or releasing at least one diagnostics laboratory transporting compartment.

In one embodiment, the diagnostics laboratory transporting compartment holder can have a cylindrical shape, a closed bottom, and an open top with an insertion area for inserting one diagnostics laboratory transporting compartment in an upright position. The diagnostics laboratory transporting compartment holder can possess a longitudinal axis substantially perpendicular to and in the midpoint of its horizontal cross section. One example of such a cylindrical diagnostics laboratory transporting compartment holder can be a single sample tube holder.

In another embodiment, the diagnostics laboratory transporting compartment holder can have a cubic shape, a closed bottom, and an open top with one or multiple insertion areas for inserting one or multiple diagnostics laboratory transporting compartments in an upright position. The cubic holder can possess one or multiple longitudinal axis in the midpoints of the one or multiple insertion areas and substantially perpendicular to its horizontal cross section. One example of such a cubic diagnostics laboratory transporting compartment holder can be test sample tube rack. Another example of such a cubic diagnostics laboratory transporting compartment holder can be a reagent cassette rack.

In one embodiment, the insertion areas of the diagnostics laboratory transporting compartment holders can comprise a flexible adapter configured to receive diagnostics laboratory transporting compartments of different dimensions.

As used herein, the term "diagnostics laboratory transporting compartment" can relate to a vessel adapted for receiving, storing, transporting, and/or releasing a content such as a test sample (e.g. blood, urine, serum, plasma, or liquefied biopsy sample, etc.), a test reagent (e.g. reagent for immunochemistry tests, clinical chemistry tests coagulation tests, hematological tests, molecular biological tests, etc.), or a combination thereof. Depending on the content of the diagnostics laboratory transporting compartment, sample processing step, and manufacturer the material as well as the dimension of the diagnostics laboratory transporting compartment like diameter, side length, height and geometry can vary.

In one embodiment, the diagnostics laboratory transporting compartment can be a vessel with a cylindrical shape, a closed bottom, and an open top, wherein the cylindrical vessel can possess a longitudinal axis substantially perpendicular to and in the midpoint of its horizontal cross section. Alternatively, the closed bottom of the cylindrical vessel can be rounded. One example of such a cylindrical diagnostics laboratory transporting compartment can be a vessel comprising a test sample.

In another embodiment, the diagnostics laboratory transporting compartment can be a vessel with a cubic shape, a closed bottom, and an open top, wherein the vessel can possess a longitudinal axis substantially perpendicular to and in the midpoint of its horizontal cross section. One example of such a cubic diagnostics laboratory transporting compartment can be a reagent cassette comprising a test reagent. Another example of such a cubic diagnostics laboratory transporting compartment can be a reaction cuvette comprising a test sample or a test reagent or a mixture thereof.

In one embodiment, the diagnostics laboratory transporting compartment can be equipped with a cap or lid, either connected to the diagnostics laboratory transporting compartment or provided independently.

In one embodiment, the laboratory system can further comprise a pipetting device having at least one aspiration and/or dispensation position. The at least one aspiration and/or dispensation position can be aligned with the vertical axis of the centering position of the at least one centering unit for diagnostics laboratory transporting compartment. With this arrangement, an accurate and safe pipetting of samples and/or reagents can be assured.

In another embodiment, the laboratory system can further comprise a handling device having at least one handling position. The at least one handle position can be aligned with the vertical axis of the centering position of the at least one centering unit for diagnostics laboratory transporting compartment. With this arrangement, an accurate and safe handling of laboratory transporting compartments can be assured.

In one embodiment, the pipetting device and/or the handling device can be part of a pre-analytical, analytical, or post-analytical station.

In one embodiment, the laboratory system can further comprise a diagnostics laboratory transporting compartment conveyor which can be capable of being operatively coupled to a laboratory conveyor system. Accordingly, the diagnostics laboratory transporting compartment conveyor can receive and release diagnostics laboratory transporting compartments from/to the laboratory conveyor system which can be connected with stations such as pre-analytical, analytical and/or post-analytical stations of a laboratory system in order to move and remove the diagnostics laboratory transporting compartment between the grippers.

In one embodiment, the diagnostics laboratory transporting compartment conveyor can be part of the laboratory conveyor system.

In one embodiment, the laboratory conveyor system can further comprise a stopper located in front of the at least one centering unit for diagnostics laboratory transporting compartment and can be configured to stop a diagnostics laboratory transporting compartment holder transported on a laboratory conveyor system. The stopper can be a pivoted barrier with a substantially perpendicular orientation relative to the transportation path of the laboratory conveyor system for blocking and releasing the transportation path of a diagnostics laboratory transporting compartment holder. As a result, the diagnostics laboratory transporting compartment can be kept stationary on the laboratory conveyor system so that a defined number of following diagnostics laboratory transporting compartments can catch up with the first the diagnostics laboratory transporting compartment holder and a group of diagnostics laboratory transporting compartments can be transported further to the at least one centering unit for diagnostics laboratory transporting compartment.

A method for centering a diagnostics laboratory transporting compartment using a centering unit for diagnostics laboratory transporting compartment as described herein. The method can comprise moving the further connector to a first moving direction, thereby extending the at least two hinged arms and positioning the grippers to a diagnostics laboratory transporting compartment receiving and releasing position; moving a diagnostics laboratory transporting compartment between the grippers; moving the further connector to a second moving direction, thereby flexing the at least two hinged arms and moving the grippers towards the vertical axis of the centering position, wherein the grippers press from opposite sides on the diagnostics laboratory transporting compartment to align the longitudinal axis of the diagnostics laboratory transporting compartment with the vertical axis of the centering position; repeating the first step to release the diagnostics laboratory transporting compartment; and removing the diagnostics laboratory transporting compartment between the grippers.

The method can be conducted briefly before a sample processing step like the pipetting of a test sample is initiated. As the centering unit for diagnostics laboratory transporting compartment can provide direct access to the open top of the diagnostics laboratory transporting compartment, the method can be conducted right in front of or at the pipetting device. The laboratory transporting compartment can even be kept in the centering position by the grippers of the centering unit during pipetting of the sample which improves significantly the safety of the sample processing step.

During the moving of the further connector to a second moving direction, thereby flexing the at least two hinged arms and moving the grippers towards the vertical axis of the centering position, the grippers can press from opposite sides on the diagnostics laboratory transporting compartment and align the longitudinal axis of the diagnostics laboratory transporting compartment with the vertical axis of the centering position. The grippers can press from opposite sides equally on the diagnostics laboratory transporting compartment as both grippers can be resiliently coupled to the same elastic member via the connector. This can improve the centering accuracy as well as the centering reliability of diagnostics laboratory transporting compartments having different dimensions as manufacturing tolerances of multiple elastic members can be prevented. The accurate centering of the diagnostics laboratory transporting compartment can avoid any contact between the diagnostics laboratory transporting compartment and pipetting devices during pipetting operations usually performed in the process of test sample analysis. Hence, a major advantage of the accurate and reliable centering can be that any test sample cross-contaminations and damages of diagnostics laboratory transporting compartments and pipetting devices can be avoided and test sample analysis results can be provided in the required quality and time.

In one embodiment, the method for centering a diagnostics laboratory transporting compartment can further comprise the following steps during moving the further connector to a first moving direction, thereby extending the at least two hinged arms and positioning the grippers to a diagnostics laboratory transporting compartment receiving and releasing position and moving the further connector to a second moving direction, thereby flexing the at least two hinged arms and moving the grippers towards the vertical axis of the centering position for centering a diagnostics laboratory transporting compartment holder:

During the moving of the further connector to a first moving direction, thereby extending the at least two hinged arms and positioning the grippers to a diagnostics laboratory transporting compartment receiving and releasing position, at least one of the hinged arms can press on the exposed end of the rotatable arm resulting in a rotation of the rotatable arm thereby positioning the further gripper to a diagnostics laboratory transporting compartment holder receiving and releasing position and building tension on the further elastic member;

During the moving of the further connector to a second moving direction, thereby flexing the at least two hinged arms and moving the grippers towards the vertical axis of the centering position, at least one of the hinged arms can release the exposed end of the rotatable arm resulting in a tension relaxation of the further elastic member and a rotation of the rotatable arm thereby moving the further gripper towards the vertical axis of the centering position. The gripper can press on the diagnostics laboratory transporting compartment holder and on the counterpart to align the longitudinal axis of the diagnostics laboratory transporting compartment holder with the longitudinal axis of the centering position.

In one embodiment, the longitudinal axis of the diagnostics laboratory transporting compartment holder can be aligned with the vertical axis of the centering position before the longitudinal axis of the diagnostics laboratory transporting compartment can be aligned with the vertical axis of the centering position and released after the diagnostics laboratory transporting compartment is released.

In a further embodiment of the method, the moving of the diagnostics laboratory transporting compartment between the grippers of the at least two hinged arms and the removing of the diagnostics laboratory transporting compartment between the grippers of the at least two hinged arms can be mediated by the diagnostics laboratory transporting compartment conveyor.

Referring initially to FIG. 1, FIGS. 1A-B shows cross sections of an embodiment of the centering unit for diagnostics laboratory transporting compartment 1 as described herein. In FIG. 1A, the grippers 9a, 9b of the centering unit for diagnostics laboratory transporting compartment 1 can be in the diagnostics laboratory transporting compartment centering position. In FIG. 1B, the grippers 9a, 9b of the centering unit 1 can be in the diagnostics laboratory transporting compartment receiving and releasing position. As illustrated, the centering unit 1 can comprise two support parts 2a, 2b which can be fixed on a frame 3 opposite each other in a defined distance. The centering unit 1 can further comprises two arms 4a, 4b. Each arm can comprise a first arm member 5a, 5b and a second arm member 6a, 6b which can be connected to each other pivotally with a respective joint 7a, 7b. As shown in FIGS. 1A-B, in the middle region of the first arm member, each arm can be connected pivotally about a pivot point 8a, 8b on each support part 2a, 2b. Grippers 9a, 9b can be attached at the end portion opposite to the joint connection of each first arm member. The middle of the distance between the two grippers can determine the vertical axis of the centering position 10. The distance between the gripper 9a, 9b and the pivot point 8a, 8b of each arm can be the same so that the contact point of the two grippers can be accurately aligned with the vertical axis of the centering position 10. FIGS. 1A-B also show a connector 11 on which the two end portions opposite to the joint connection of each second arm member can be connected pivotally about two pivot points 12a, 12b and the connector 11 can be connected movably on the guiding element 13. In the shown embodiment, the centering unit for diagnostics laboratory transporting compartment 1 can comprise the elastic member 14, which can be connected with the connector 11 and the further connector 15. The further connector 15 can be connected movably on the guiding element 13. The centering unit for diagnostics laboratory transporting compartment 1 can have an actuator 16 to move the further connector away and towards the pivot points 8a, 8b.

As shown in FIG. 1B, the further connector 15 was moved away from the pivot points 8a, 8b compared to FIG. 1A. The movement of the further connector away from the pivot points 8a, 8b, 15 can result in a rotation of the first arm members 5a, 5b and second arm members 6a, 6b away from each other and in a synchronous extension of the two arms 4a, 4b. Thereby the grippers 9a, 9b can be positioned to a diagnostics laboratory transporting compartment receiving and releasing position. When the further connector 15 is moved again towards the pivot points 8a, 8b as shown in FIG. 1A, the first arm members 5a, 5b and second arms members 6a, 6b can rotate towards each other and the two arms 4a, 4b can flex. Thereby the grippers 9a, 9b can move towards the vertical axis of the centering position 10.

As shown in FIG. 1 the centering unit for diagnostics laboratory transporting compartment 1 can comprise a further support part 17 which can be fixed on the frame 3 underneath of one of the two support parts 2b. A further arm 18 can be connected pivotally about a pivot point 19 on the further support part. The further arm 18 can have an exposed end 20 which can be positioned within a planar triangle defined by the first and the second arm member of one of the two arms 4b. At the end portion opposite to the exposed end, the further arm 18 can have a further gripper 21, wherein the further gripper can be located underneath of the gripper of one of the two arms 9b. FIG. 1A also shows a counterpart 22 which can be part of the frame 3 and located underneath of one of the two support parts 2a and opposite to the further gripper 21 when the further gripper is in a centering position. When the arms 4a, 4b can be extended as shown in FIG. 1B, the first arm member of one of the two arms 5b can press on the exposed end 20 of the further arm 18 resulting in a rotation of the further arm thereby positioning the further gripper 21 of the further arm to a diagnostics laboratory transporting compartment holder receiving and releasing position and building tension on the further elastic member. When the arms 4a, 4b flex again as shown in FIG. 1A, the first arm member of one of the two arms 5b can release the exposed end 20 of the further arm 18 resulting in a tension relaxation of the further elastic member and a rotation of the further arm thereby moving the further gripper 21 towards the vertical axis of the centering position 10. As further shown in FIGS. 1A-B, the centering unit for diagnostics laboratory transporting compartment can comprise a light barrier 27 for detecting the presence and/or absence of the diagnostics laboratory transporting compartment holders or diagnostics laboratory transporting compartment between the arm pairs of the centering units.

FIG. 2A-C show side views of an embodiment of the centering unit for diagnostics laboratory transporting compartment 1 which can be connected to seven further centering units for diagnostics laboratory transporting compartment 1a-1g for maximally centering eight diagnostics laboratory transporting compartments at the same time. FIG. 2A shows the connected centering units for diagnostics laboratory transporting compartment 1a-1g having their grippers 9a-90 in a diagnostics laboratory transporting compartment reviving/releasing position. In the shown embodiment, the grippers 9a-90 can be bifurcated so that a contact surface with the diagnostics laboratory transporting compartment at the centering position can be formed like a U or V from the top view. As further shown, the further connectors of each centering unit for diagnostics laboratory transporting compartment can be connected to one common connector 23. The common connector 23 can be connected movably on the guiding elements of each centering unit 13. As shown in FIG. 2A, the connected centering units for diagnostics laboratory transporting compartment 1a-1g can have a single actuator 16 which can be coupled to the common connector 23 with two toothed belts 24a, 24b. This can provide an easy and cost-efficient actuation of multiple centering units for diagnostics laboratory transporting compartment 1a-1g. Of course, the number of connected centering units for diagnostics laboratory transporting compartment 1a-1g can be scalable according to the number of aspiration and/or dispensation positions of different pipetting devices or to the number of handle positions of different handling devices.

FIG. 2B shows the connected centering units for diagnostics laboratory transporting compartment 1a-1g where eight diagnostics laboratory transporting compartments 25a-h with the same diameter and height are placed between the grippers of the centering units, whereas in FIG. 2C, the diagnostics laboratory transporting compartments 25a-j can have two different diameters. The diagnostics laboratory transporting compartments 25i and 25j can have a smaller diameter compared to the diagnostics laboratory transporting compartments 25a, 25b, 25d, 25f, 25g and 25h. Depending on the diameter of the diagnostics laboratory transporting compartment the elastic members 14a-14g) can be under different compressions: the larger the diameter of the diagnostics laboratory transporting compartment, the higher the compression of the elastic member. Accordingly, the elastic members 14, 14a, 14c, 14e, 14f and 14g can be under higher compression compared to the elastic members 14b and 14d.

Figure 3:
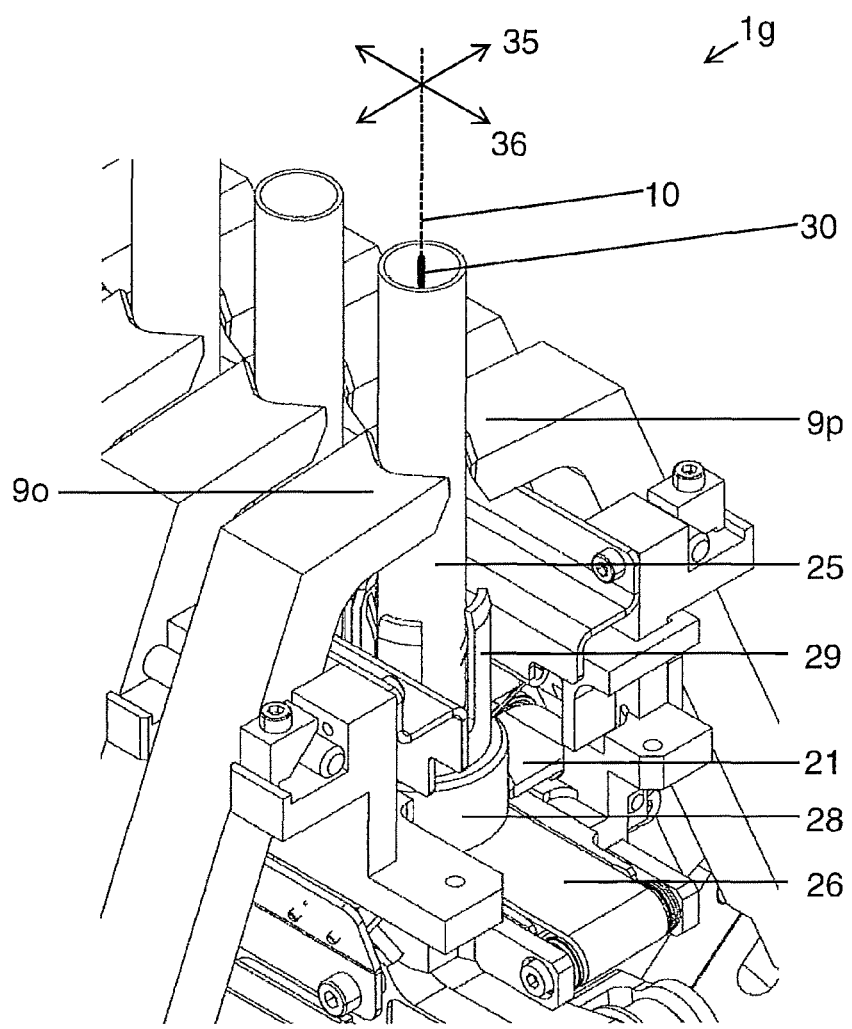
FIG. 3 illustrates a perspective and enlarged view of a centering unit for diagnostics laboratory transporting compartment where the grippers of the centering unit for diagnostics laboratory transporting compartment are aligning the longitudinal axis of the diagnostics laboratory transporting compartment and diagnostics laboratory transporting compartment holder with the vertical axis of the centering position according to an embodiment of the present disclosure.

FIG. 3 provides a perspective and enlarged view of the centering unit for diagnostics laboratory transporting compartment 1g of FIG. 2 where a diagnostics laboratory transporting compartment holder 28 with a flexible adaptor 29 is centered by the further gripper 21 and the diagnostics laboratory transporting compartment 25 is centered by the bifurcated grippers 9o, 9p. The opposite positions of the grippers 9o, 9p of the connected centering unit 1g can enable the alignment of the longitudinal axis 30 of the diagnostics laboratory transporting compartment 25 and diagnostics laboratory transporting compartment holder 28 with the vertical axis of the centering position 10 along the lateral axis of the centering unit for diagnostics laboratory transporting compartment 1g 35. In the shown embodiment, the grippers 9o, 9p of the centering unit are bifurcated. The bifurcated grippers can enable the alignment of the longitudinal axis 30 of the diagnostics laboratory transporting compartment 25 and diagnostics laboratory transporting compartment holder 28 with the vertical axis of the centering position 10 along the axis substantially perpendicular the lateral axis of the centering unit 36. In one embodiment, the centering units for diagnostics laboratory transporting compartments can be connected to a diagnostics laboratory transporting compartment conveyor 26 for moving and removing the diagnostics laboratory transporting compartments between the grippers 9o, 9n.

Figure 4:
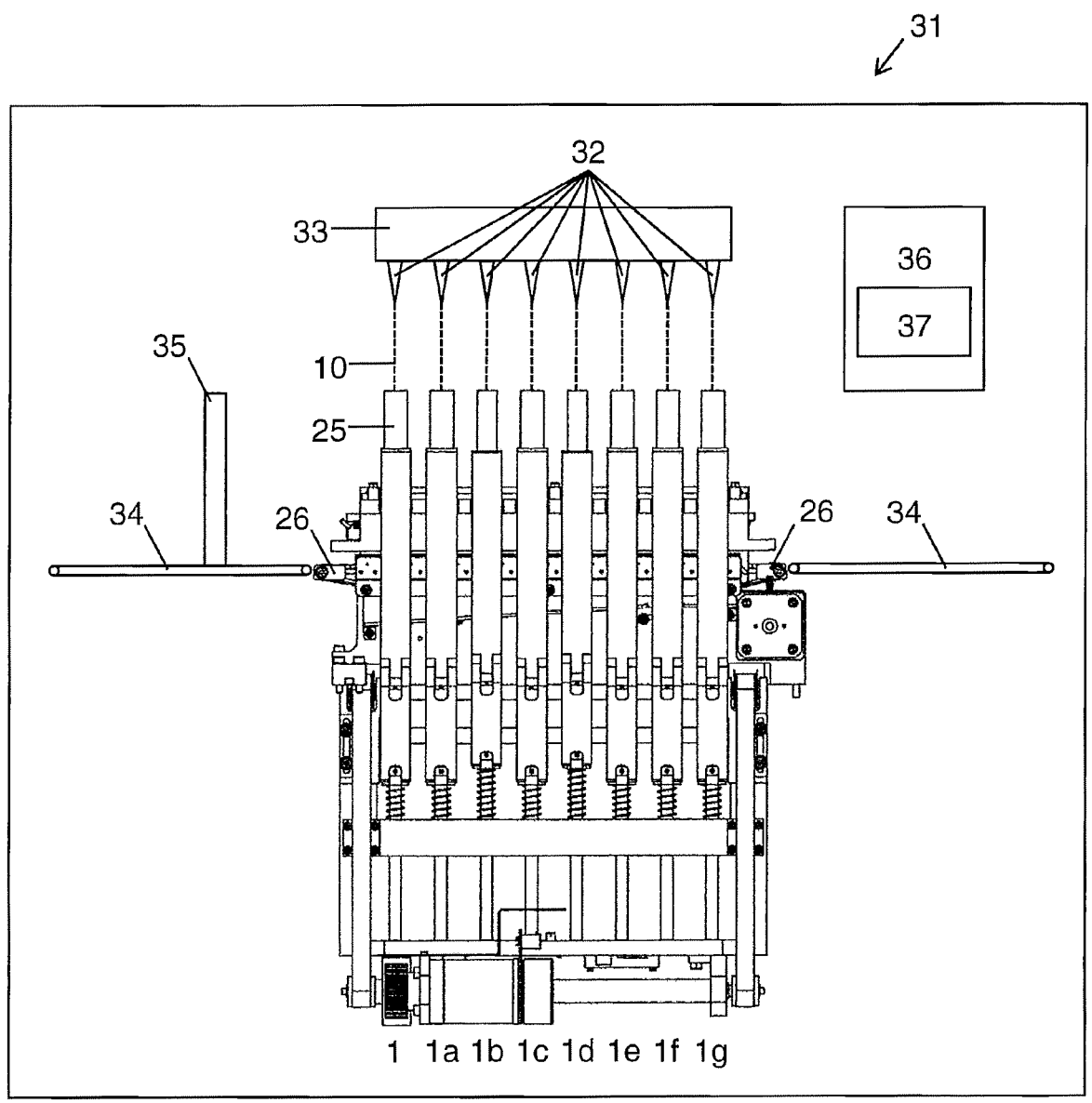
FIG. 4 illustrates a laboratory system for centering diagnostics laboratory transporting compartments and diagnostics laboratory transporting compartment holders according to an embodiment of the present disclosure.

FIG. 4 shows an embodiment of a laboratory system 31 to center eight diagnostics laboratory transporting compartment with different diameters 25 for eight aspiration/dispensation positions 32 of a pipetting device 33 at the same time. The eight diagnostics laboratory transporting compartment with different diameters 25 can be inserted in eight diagnostics laboratory transporting compartment holder with flexible adaptors (29 in FIG. 3). Each aspiration and/or dispensation position 32 can be aligned with the vertical axis of the centering position 10 of the corresponding centering unit for diagnostics laboratory transporting compartment 1a-1g. For moving and removing the diagnostics laboratory transporting compartment holders between the arm pairs of the centering units for diagnostics laboratory transporting compartment 1a-1g, the laboratory system can comprise a diagnostics laboratory transporting compartment conveyor 26 which can be operatively coupled to a laboratory conveyor system 34. When the diagnostics laboratory transporting compartment holders and corresponding diagnostics laboratory transporting compartments are located between the arm pairs, the interruption of a light beam can be detected by a light barrier (27 of FIG. 1) and can generate a signal which can be transmitted to a control device 36. The control device 36 can comprise a computing device 37 adapted to execute software which can be configured to interpret the signal and to send commands to the actuator in order to move the further connector towards the pivot points and thereby moving the grippers towards the vertical axis of the centering position 10. As further shown in FIG. 4, in front of the connected centering units for diagnostics laboratory transporting compartment, a stopper 35 for grouping diagnostics laboratory transporting compartments to be centered which can then be transported to the connected centering units for diagnostics laboratory transporting compartment.

Figures 5A, 5B:
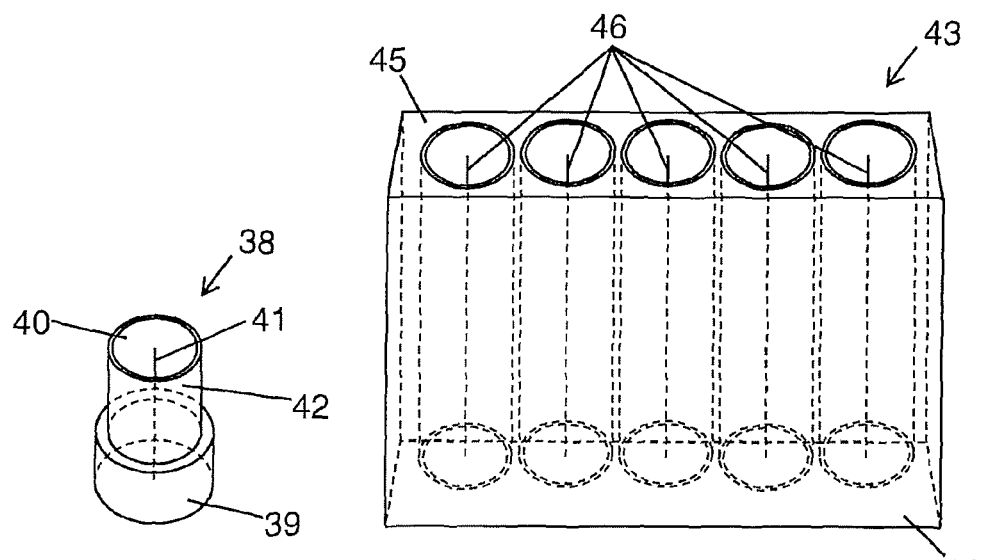
FIGS. 5A-G illustrate embodiments of diagnostics laboratory transporting compartment holders and diagnostics laboratory transporting compartments according to an embodiment of the present disclosure.
Figures 5C, 5D, 5E:
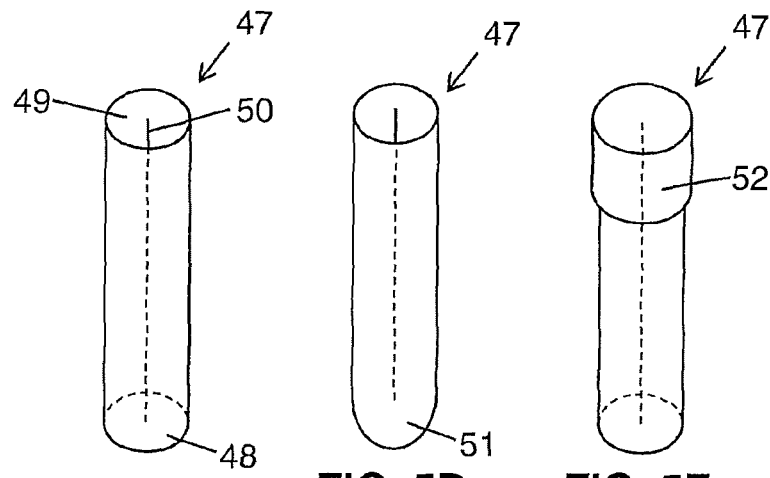
Figures 5F, 5G:
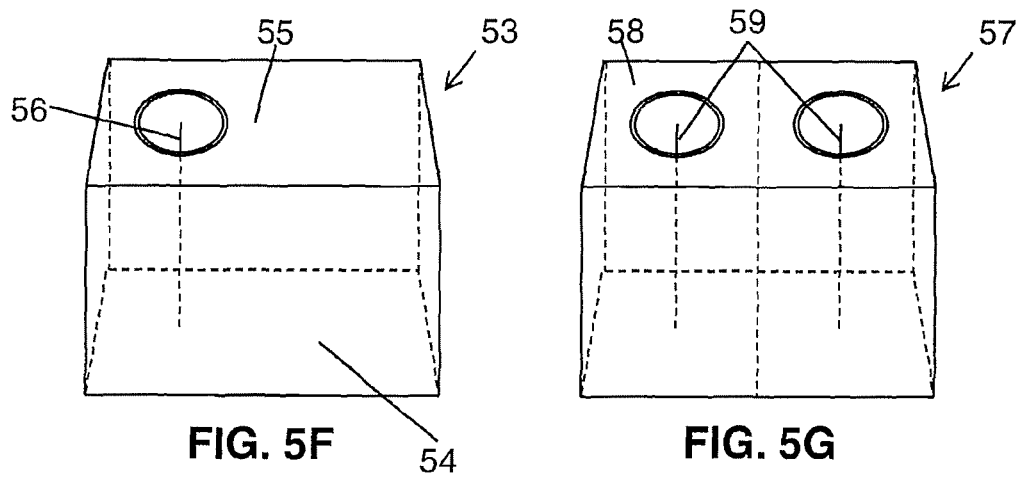

FIGS. 5A-B show embodiments of diagnostics laboratory transporting compartment holders. FIG. 5A shows a diagnostics laboratory transporting compartment holder 38 having a cylindrical shape, a closed bottom 39, and an open top with an insertion area 40 for inserting one diagnostics laboratory transporting compartment in an upright position. The diagnostics laboratory transporting compartment holder 38 can possess a longitudinal axis 41 substantially perpendicular to and in the midpoint of its horizontal cross section. The insertion area of the diagnostics laboratory transporting compartment holder can comprise a flexible adapter 42 configured to receive diagnostics laboratory transporting compartments of different dimensions. FIG. 5B shows a diagnostics laboratory transporting compartment holder 43 having a cubic shape, a closed bottom 44, and a top with five insertion areas 45 for inserting multiple diagnostics laboratory transporting compartments in an upright position. The cubic diagnostics laboratory transporting compartment holder can possess 43 five longitudinal axes 46 in the midpoints of the five insertion areas and substantially perpendicular to its horizontal cross section. FIG. 5C-G shows embodiments of diagnostics laboratory transporting compartments. FIG. 5C shows a diagnostics laboratory transporting compartment 47 having a cylindrical shape, a closed bottom 48, and an open top 49. The cylindrical diagnostics laboratory transporting compartment can possess a longitudinal axis 50 substantially perpendicular to and in the midpoint of its horizontal cross section. Alternatively, the closed bottom 51 of the cylindrical diagnostics laboratory transporting compartment 47 can be rounded as shown in FIG. 5D. FIG. 5E depicts a diagnostics laboratory transporting compartment 47 equipped with a cap 52. In FIG. 5F a diagnostics laboratory transporting compartment having a cubic shape 53, a closed bottom 54, and a top with one pipetting opening 55 is shown. The diagnostics laboratory transporting compartment can possess one longitudinal axis 56 which can be in the midpoint of the one pipetting opening and substantially perpendicular to its horizontal cross section. In FIG. 5G a cubic diagnostics laboratory transporting compartment 57 having a top with two pipetting openings 58 is shown. Accordingly, the diagnostics laboratory transporting compartment can possess two longitudinal axes 59 which can be in the midpoint of the two pipetting openings and substantially perpendicular to its horizontal cross section.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A centering unit for diagnostics laboratory transporting compartment, the centering unit comprising:
at least two hinged arms with grippers at each end portion, wherein the at least two hinged arms are mounted pivotally and opposite each other on a frame, wherein a vertical axis of a centering position is determined by a middle distance between the grippers;
a first connector to which each of the other end portions of the hinged arms are connected pivotally, wherein the first connector is movably connected on a guiding element;
a second connector, wherein the second connector and the first connector are resiliently connected to each other with an elastic member, wherein the second connector is movably connected on the guiding element;
at least one rotatable arm with an exposed end and a third gripper at the end opposite the exposed end, wherein the exposed end is positioned so that a rotation of the rotatable arm and movement of the third gripper away from the vertical axis of the centering position is triggered by engagement with one of the at least two hinged arms; and
an actuator for moving the second connector, wherein the centering unit is connected to at least one further centering unit, wherein the further connectors of each centering unit are connected to a common connector, wherein the common connector is connected movably on at least two guiding elements, wherein the common connector is coupled to the actuator.

2. The centering unit according to claim 1,
wherein the at least one rotatable arm is coupled pivotally and opposite to a counterpart on the frame with a further elastic member or on a further frame with a further elastic member.

3. The centering unit according to claim 2, wherein the grippers of the at least two hinged arms and the third gripper of the rotatable arm are bifurcated.

4. The centering unit according to claim 2, wherein the further elastic member is a torsion spring.

5. The centering unit according to claim 1, wherein the elastic member is a spring.

6. The centering unit according to claim 2, wherein the counterpart is a further rotatable arm with an exposed end and a fourth gripper.

7. The centering unit according to claim 1, wherein each of the at least two hinged arms comprises a first arm member and a second arm member connected to each other pivotally with a respective joint, wherein in the middle region of the first arm member each hinged arm is connected pivotally about a pivot point on the frame, wherein the distance between the gripper and the pivot point of each of the at least two hinged arms and the distance between the pivot point and the respective joint of each of the at least two hinged arms have a ratio between 1 and 0.1.

8. A laboratory system, the laboratory system comprising:
at least one centering unit according to claim 1;
at least one diagnostics laboratory transporting compartment holder having one or more flexible adaptors configured to receive at least one diagnostics laboratory transporting compartment of different dimensions; and
at least one diagnostics laboratory transporting compartment, wherein the at least one diagnostics laboratory transporting compartment is a vessel comprising a test sample, wherein the at least one diagnostics laboratory transporting compartment is inserted in the diagnostics laboratory transporting compartment holder.

9. The laboratory system according to claim 8, further comprising,
a pipetting device having at least one aspiration and/or dispensation position or a handling device having at least one handle position, wherein the at least one aspiration and/or dispensation position or the handle position is aligned with the vertical axis of the centering position.

10. The laboratory system according to claim 8, further comprising,
a diagnostics laboratory transporting compartment conveyor, wherein the diagnostics laboratory transporting compartment conveyor is capable of being operatively coupled to a laboratory conveyor system.

11. A method for centering a diagnostics laboratory transporting compartment using the centering unit according to claim 1, the method comprising:
a) moving the second connector to a first moving direction, thereby extending the at least two hinged arms and positioning the grippers to a diagnostics laboratory transporting compartment receiving and releasing position;
b) moving a diagnostics laboratory transporting compartment between the grippers;
c) moving the second connector to a second moving direction, thereby flexing the at least two hinged arms and moving the grippers towards the vertical axis of the centering position, wherein the grippers press from opposite sides on the diagnostics laboratory transporting compartment to align the longitudinal axis of the diagnostics laboratory transporting compartment with the vertical axis of the centering position;
d) repeating step a) to release the diagnostics laboratory transporting compartment; and
e) removing the diagnostics laboratory transporting compartment between the grippers.

12. The method according to claim 11, wherein in step a) at least one of the hinged arms presses on the exposed end of the rotatable arm resulting in the rotation of the rotatable arm thereby positioning k third gripper to a diagnostics laboratory transporting compartment holder receiving and releasing position and building tension on a further elastic member, wherein in step c) at least one of the hinged arms releases the exposed end of t rotatable arm resulting in a tension relaxation of the further elastic member and the rotation of the rotatable arm thereby moving the third gripper towards the vertical axis of the centering position, wherein the third gripper presses on the diagnostics laboratory transporting compartment holder and on a counterpart to align the longitudinal axis of the diagnostics laboratory transporting compartment holder with the longitudinal axis of the centering position.

13. The method according to claim 12, wherein the longitudinal axis of the diagnostics laboratory transporting compartment holder is aligned with the vertical axis of the centering position before the longitudinal axis of the diagnostics laboratory transporting compartment is aligned with the vertical axis of the centering position and released after the diagnostics laboratory transporting compartment is released.

14. The method according to claim 11, wherein the moving of the diagnostics laboratory transporting compartment between the grippers of the at least two arms and the removing of the diagnostics laboratory transporting compartment between the grippers of the at least two arms is mediated by a diagnostics laboratory transporting compartment conveyor.

* * * * *